(12) United States Patent
Hyatt

(10) Patent No.: US 12,423,226 B2
(45) Date of Patent: Sep. 23, 2025

(54) MEMORY MAPPING AND CXL TRANSLATION TO EXPLOIT UNUSED REMOTE MEMORY IN A MULTI-HOST SYSTEM

(71) Applicant: UnifabriX Ltd., Haifa (IL)

(72) Inventor: Ronen Aharon Hyatt, Haifa (IL)

(73) Assignee: UnifabriX Ltd., Haifa (IL)

( * ) Notice: Subject to any disclaimer, the term of this patent is extended or adjusted under 35 U.S.C. 154(b) by 29 days.

(21) Appl. No.: 18/611,472

(22) Filed: Mar. 20, 2024

(65) Prior Publication Data
US 2024/0256441 A1 Aug. 1, 2024

Related U.S. Application Data

(63) Continuation-in-part of application No. 18/495,743, filed on Oct. 26, 2023, now abandoned.

(60) Provisional application No. 63/419,688, filed on Oct. 26, 2022.

(51) Int. Cl.
*G06F 12/02* (2006.01)

(52) U.S. Cl.
CPC ................. *G06F 12/0246* (2013.01)

(58) Field of Classification Search
CPC .. G06F 12/0246; G06F 12/08; G06F 12/1475; G06F 2212/657; G06F 3/0604; G06F 12/1009; G06F 2212/1044; G06F 12/023; G06F 2212/1016; G06F 3/0631
USPC .......... 711/105, E12.001, E12.002, 104, 170
See application file for complete search history.

(56) References Cited

U.S. PATENT DOCUMENTS

| | | | |
|---|---|---|---|
| 11,360,906 B2 | 6/2022 | Duan | |
| 11,740,958 B2 | 8/2023 | Das Sharma | |
| 11,789,878 B2 | 10/2023 | Graniello | |
| 11,816,036 B2 | 11/2023 | Vasudevan | |
| 11,847,459 B2 | 12/2023 | Agarwal | |
| 11,995,017 B2 | 5/2024 | Norrie | |
| 12,040,991 B2 | 7/2024 | Kar | |
| 2007/0106860 A1* | 5/2007 | Foster, Sr. | G06F 1/3275 711/170 |
| 2018/0018006 A1* | 1/2018 | Kudo | G06F 11/3058 |

(Continued)

OTHER PUBLICATIONS

Hyatt Ronen, "CXL in the AI Era: A Midterm Report—Technology, Achievements, Challenges, Innovation". May 9, 2024. USPTO Tech Fair.

(Continued)

*Primary Examiner* — Jared I Rutz
*Assistant Examiner* — Edward Waddy, Jr.
(74) *Attorney, Agent, or Firm* — Active Knowledge Ltd.

(57) ABSTRACT

This invention pertains to a system optimized for reutilizing allocated underutilized or unused allocated DRAM, comprising a first host, a second host, and a resource composer, interconnected via CXL. Both hosts run packaged computing environments (PCEs), which may be containers or virtual machines, and are equipped to handle respective processes, P1 and P2. The resource composer is tasked with receiving data related to P1's memory usage from a kernel module on the first host, identifying underutilized DRAM mapped to P1, and subsequently remapping it to P2's address space on the second host. This process involves the use of CXL.mem commands, which are then translated into appropriate CXL.cache or CXL.io commands for DRAM access based on the mapping.

20 Claims, 15 Drawing Sheets

(56) References Cited

U.S. PATENT DOCUMENTS

| | | | |
|---|---|---|---|
| 2020/0242042 | A1 | 7/2020 | Svennebring |
| 2021/0232520 | A1 | 7/2021 | Choudhary |
| 2021/0240655 | A1 | 8/2021 | Das Sharma |
| 2022/0004488 | A1 | 1/2022 | Paul |
| 2023/0022544 | A1 | 1/2023 | Willhalm |
| 2023/0029026 | A1 | 1/2023 | Guim Bernat |
| 2023/0036751 | A1 | 2/2023 | Guim Bernat |
| 2023/0229498 | A1 | 7/2023 | Agarwal |
| 2023/0325265 | A1 | 10/2023 | Balle |
| 2023/0359578 | A1 | 11/2023 | Lee |
| 2023/0376427 | A1 | 11/2023 | Oh |
| 2023/0393997 | A1 | 12/2023 | Shah |
| 2024/0289286 | A1 | 8/2024 | Sun |

OTHER PUBLICATIONS

Mellor Chris, "UnifabriX taking CXL external memory mainstream", Jan. 15, 2025, https://blocksandfiles.com/2025/01/15/unifabrix-taking-cxl-external-memory-mainstream/.

Compute Express Link (CXL) Specification Revision 3.1, Aug. 7, 2023, Compute Express Link Consortium, Inc.

Compute Express Link (CXL) Specification Revision 2.0, Oct. 2020, Compute Express Link Consortium, Inc.

Compute Express Link (CXL) Specification Revision 1.1, Jun. 2019, Compute Express Link Consortium, Inc.

Debendra Das Sharma, Robert Blankenship, and Daniel Berger. 2024. An Introduction to the Compute Express Link (CXL) Interconnect. ACM Comput. Surv. 56, 11, Article 290 (Jul. 2024).

CXL* Type 3 Memory Device Software Guide, System Firmware, UEFI and OS Software Implementation Guide. Revision 1.0. Jul. 2021. Intel.

PCI Express® Base Specification Revision 6.2. Jan. 25, 2024. PCI-SIG Specification.

PCI Express* 6.0 Retimer Supplemental Features and Standard BGA Footprint Specification. Revision 0.9. Jul. 2024. Intel.

4th Gen Intel® Xeon® Scalable Processor XCC (Codename Sapphire Rapids) Uncore Performance Monitoring Guide. Revision 001. Apr. 2024. Intel.

OSFP MSA Specification for OSFP Octal Small Form Factor Pluggable Module. Rev 5.1. Sep. 12, 2024.

\* cited by examiner

MEMORY MAPPING AND CXL TRANSLATION TO EXPLOIT UNUSED REMOTE MEMORY IN A MULTI-HOST SYSTEM

CROSS-REFERENCE TO RELATED APPLICATIONS

This application is a Continuation-In-Part of U.S. application Ser. No. 18/495,743, filed Oct. 26, 2023, which claims priority to U.S. Provisional Patent Application No. 63/419,688, filed Oct. 26, 2022.

BACKGROUND

Compute Express Link (CXL) is an open standard for high-speed CPU-to-device and CPU-to-memory connections, designed for high performance data center computers. CXL is built on the PCI Express (PCIe) physical and electrical interface and includes PCIe-based block input/output protocol (CXL.io), cache-coherent protocols for accessing system memory (CXL.cache), and cache-coherent protocols for accessing device memory (CXL.mem).

NVM Express (NVMe) is an open, logical-device interface specification for accessing a computer's non-volatile storage media usually attached via PCI Express (PCIe) bus. The initialism NVM stands for non-volatile memory, which is often NAND flash memory that comes in several physical form factors, including solid-state drives (SSDs), PCIe add-in cards, and M.2 cards. NVM Express, as a logical-device interface, has been designed to capitalize on the low latency and internal parallelism of solid-state storage devices. Architecturally, the logic for NVMe is physically stored within and executed by the NVMe controller chip that is physically co-located with the storage media, usually an SSD. By its design, NVM Express allows host hardware and software to fully exploit the levels of parallelism possible in modern SSDs. As a result, NVM Express reduces I/O overhead and brings various performance improvements relative to previous logical-device interfaces, including multiple long command queues, and reduced latency.

SUMMARY

Memory utilization in distributed computing environments presents various challenges, including making the most of underutilized DRAM, also referred to herein as unused DRAM or unused-allocated-DRAM. The following embodiment alleviates these challenges by configuring a system to effectively utilize DRAM that is otherwise left idle. This system incorporates multiple hosts and a resource composer, interconnected via Compute Express Link (CXL), offering a robust framework for managing memory resources across different computing entities. The system includes a first host and a second host, each configured to operate first and second packaged computing environments (PCE1, PCE2), which are versatile environments with the capability to run a variety of instances such as containers and/or virtual machines. The hosts are interconnected with a resource composer via CXL, establishing a high-speed communication channel that facilitates efficient memory management and resource allocation.

The resource composer manages DRAM utilization, and is configured to communicate with a kernel module running on the host of the DRAM to be utilized (e.g., the first host), acquiring data pertaining to the page table and process control block of a process P1 within PCE1. This data provides insight into the memory usage patterns of P1, enabling the resource composer to make informed decisions on memory allocation. Using the acquired data, the resource composer evaluates the usage of DRAM by P1, identifying portions of its address space that have remained unused/underutilized for a predefined duration. Upon identifying such unused/underutilized memory, the resource composer may proceed to map the corresponding page frames, which point to the first host's DRAM, to the address space of a process on another host, such as a second process P2 running in PCE2 on the second host.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1:
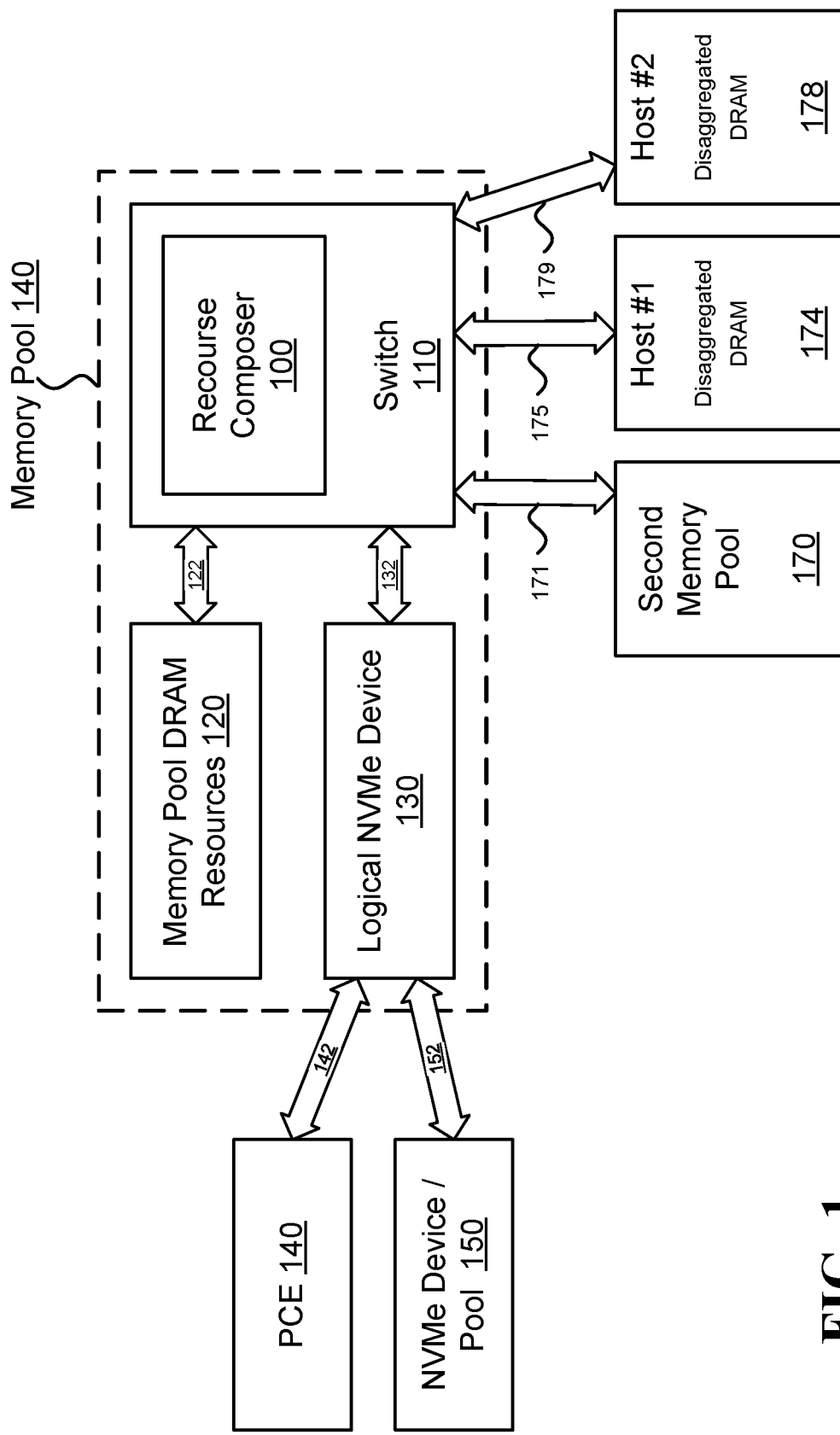
FIG. 1 illustrates System view showing a Memory Pool with switch and Logical NVMe Device connected to PCE and NVMe Device/Pool.

The term "Compute Express Link" (CXL) as used herein refers to currently available and/or future versions, variations and/or equivalents of the open standard defined by the CXL Consortium.

The term "resource composer" as used herein refers to a computer configured to run logic that initiates management commands, such as configurations, reconfigurations, and/or management of pooled resources, and/or other logic related to managing the network, managing/allocating/and/or controlling network resources, and/or running processes related to management/allocation/maintenance/governance of network resources. The resource composer may be implemented in various hardware and/or software configurations, such as an ASIC, an FPGA, a hardware accelerator, software running on a host machine, embedded software running on a management controller, a state machine running within a managed CXL device, embedded firmware running on another CXL device, software and/or firmware running on a switch, and/or according to current and/or future fabric manager guidelines defined in the CXL standard and/or to be defined in future versions of the CXL standard. The resource composer may be implemented as a single computer (which covers anything having a processor, memory, and an I/O interface, such as specific implementations of ASIC, FPGA, server, accelerator, and/or switch), and/or as a distributed computation entity running on a combination of computing machines, such as ASICs, FPGAs, servers, hosts, network devices, accelerators, and/or switches.

In addition to the aforementioned configurations, the resource composer may be implemented in various ways. It may be seamlessly integrated within a switch, enabling direct management of pooled resources and network traffic, and/or implemented in a tight manner to a switch, optionally facilitating efficient communication between the two entities. The resource composer may be implemented within a host, optionally allowing for close coordination with the local computing environment and/or resources. Alternatively, the resource composer may be implemented within a memory pool manager configured to manage large pools of memory resources. This placement would provide the resource composer with better access to memory resources, optionally enhancing its ability to manage and allocate memory in an efficient manner. Furthermore, the resource composer may be implemented within a managed CXL device, optionally facilitating good integration with CXL protocols and operations. It is noted that the architecture of the resource composer is not necessarily limited to a single location or device. Different components of the resource composer may be distributed across various elements within the system, fostering a modular and scalable approach to resource management. For example, certain management and allocation functionalities could reside within a switch, while other preprocessing operations could be handled by the kernel module. Additionally, at least some of the memory management tasks could be delegated to a memory pool manager to improve efficiency of resource utilization. By distributing the functionalities of the resource composer across different elements, the system may improve its stability, efficiency, flexibility, and/or scalability. Each component of the resource composer may be strategically placed to optimize performance, enhance resource utilization, and/or ensure seamless operation across the network.

Herein, a memory page is a block of virtual memory, described by an entry in a page table. A page frame is the block of physical memory into which memory pages are mapped by the operating system. A memory page may not be mapped into a page frame, and a page frame may be mapped into multiple memory pages, possibly in different address spaces. An address space, which in some cases may also be referred to as a virtual address space, is the set of addresses used by a program to reference instructions and data.

Usually, hypervisor allocates memory to virtual machines (VMs), and assigns each VM its own address space (at the hypervisor's level). The operating system of a VM allocates memory to the processes run by the VM, and assigns each process its own address space (at the VM's level). A process may have threads that share the same virtual addresses.

The connectivity interfaces between the host computers may be implemented with different performance levels at different costs. (i) At the low end, solutions that are mostly software-based, such as NVMe over TCP and/or NVMe over CXL, may provide a solution at virtually no cost by using the Ethernet and/or CXL interfaces available on a platform; (ii) Hardware acceleration for heavy tasks, such as security processing on the network interface controller, enables absorbing the performance impact for an intermediate cost; and (iii) At the high end, smart front-end units and/or data processing units may offload most, or even the entire, NVMe related processing from a platform. This hardware-based solution may provide up to full date rate performance, and possibly also present at least some of the networked storage as native storage that is locally attached to a host.

The terms "network interface controller", "network interface card", "network adapter", "physical network interface" and other similar variations, which may be denoted as "NIC", refer to a hardware component that connects a device to a computer network.

The term "network" as used herein refers to any interconnection of three or more devices, over at least three communication links, which facilitates the transport of information between at least some of the devices connected to the network. For example, any network topology that interconnects at least three devices over CXL, PCIe, Ethernet, and/or Fibre Channel protocols is referred herein as a network. A network may include, for example, a switch, a hub, a repeater, and/or at least three point to point communication links interconnecting at least three devices.

The terms "host", "host operating system", "host system" and other similar variations are interchangeable and refer to at least one of (i) software and/or firmware configured to run on a computer and interact with the hardware, (ii) a computer configured to run one or more virtual machines and/or containers, and (iii) a computer that can be connected to a network (such as CXL, Ethernet, and/or Fibre Channel) and share and consume recourses. For example, the following devices can be considered hosts if they can share and consume resources: a server, a network device, a memory entity, and/or a computation entity.

The term "Non-Volatile Memory Express" (NVMe) as used herein refers to current and/or future variations and/or equivalents of logical-device interface specification for accessing a computer's non-volatile storage media. The term NVMe also covers the term NVMe over Fabrics (NVMe-oF).

Herein, terms in the form of "modular unit", "modular memory pool", "modular host", or "modular device" refer to equipment designed to be mounted impermanently to a chassis and dismounted from the chassis when needed, such as a rack module (e.g., rack server, rack storage) configured to be mounted in a rack, or a blade equipment (e.g., blade server, blade storage) configured to be mounted in a blade enclosure or a sled.

The term "logical address" as used here is context-dependent, which may encompass a broad and inclusive range of address representations. In certain contexts, logical address might be synonymous with a virtual address, describing a memory location in the virtual memory space. In other contexts, logical address may refer to specific subsets or levels within the hierarchical structure of virtual addresses. And in still other contexts, logical address is not constrained to virtual addresses alone and may also denote a physical address, referring directly to a location in physical memory.

In contemporary computing environments, the efficient utilization of memory resources is paramount, especially in scenarios where multiple computing entities are involved. There exists a challenge in effectively utilizing unused-allocated-DRAM across various hosts in a system, leading to a need for an innovative solution. The embodiment described herein addresses this challenge by configuring a system to use unused-allocated-DRAM that may be located on multiple hosts and one or more memory pools, interconnected through Compute Express Link (CXL). This embodiment supports running diverse packaged computing environments, which can encompass containers, virtual machines, or a combination of both, providing versatility in application deployment and management.

Memory utilization in distributed computing environments presents various challenges, including making the most of unused allocated DRAM. This embodiment alleviates these challenges by configuring a system to effectively utilize DRAM that is otherwise left idle. This system incorporates multiple hosts and a resource composer, interconnected via Compute Express Link (CXL), offering a robust framework for managing memory resources across different computing entities. The system includes a first host and a second host, each configured to operate first and second packaged computing environments (PCE1, PCE2), which are versatile environments with the capability to run a variety of instances such as containers and/or virtual machines. The hosts are interconnected with a resource composer through CXL, establishing a high-speed communication channel that facilitates efficient memory management and resource allocation.

The resource composer plays a pivotal role in managing DRAM utilization in this embodiment. The resource composer is configured to interface with a kernel module running on the first host, acquiring essential data pertaining to the page table and process control block of a process P1 within PCE1. This data provides insight into the memory usage patterns of P1, enabling the resource composer to make informed decisions on memory allocation. Using the acquired data, the resource composer evaluates the usage of DRAM by P1, identifying portions of its address space that have remained unused for a predefined duration. Upon identifying such unused memory, the resource composer proceeds to map the corresponding page frames, which point to DRAM on the first host, to the address space of a second process P2 operating in PCE2 on the second host.

In one embodiment, to facilitate communication with PCE2 and to manage the memory allocation for P2, the resource composer utilizes CXL.mem protocol that serves as a medium for the resource composer to interact with PCE2. Based on the mappings established between the DRAM page frames and P2's address space, the resource composer translates the CXL.mem commands into either CXL.cache or CXL.io commands. This translation tailors the commands to the appropriate format for accessing the DRAM page frames, ensuring seamless memory access and utilization. This configuration enables the system to utilize the unused-allocated-DRAM, contributing to overall system efficiency and performance.

Efficient memory management and precise address translation are required to optimize the utilization of resources and ensure seamless operation across various hosts. The following embodiments discuss various techniques and configurations to enhance the system's capability in handling memory resources, particularly in the context of utilizing unused allocated DRAM. Addressing the complexities of memory management, the system incorporates a resource composer with a switch, facilitating robust address translation and mapping functionalities. This setup enables the translation of virtual addresses to physical addresses, ensuring that memory access requests are directed to the correct locations, essentially regardless of their physical placement in the distributed system. Optionally, the resource composer configures the IOMMU or MMU on the second host, adding entries that map remote physical pages to local virtual pages, which provides the second host with seamless access to memory resources located on the first host.

Alternatively, the system may leverage CXL's Address Translation Services (ATS) and/or Segment Translation Services (STS) to enhance its address translation capabilities. ATS may be utilized to intercept memory access requests from processes running on the second host, translating their virtual addresses to the corresponding physical addresses on the first host. This ensures that the data integrity is maintained, and the requests are accurately fulfilled. On the other hand, STS may be employed to define unused physical pages on the first host as a global space, subsequently mapping this space to a local space accessible to processes on the second host. This mapping can optimize the utilization of DRAM to improve the system's ability to repurpose the unused memory and to make it available to processes that require additional resources. By integrating these memory management and address translation techniques, the system may achieve a higher level of efficiency in DRAM utilization, contributing to improved performance and resource optimization in distributed computing environments.

The resource composer may include complete capabilities of a switch, partial capabilities of a switch that are enough for its operation, or operate in coordination with a switch. In one embodiment, the system enables "dynamic" mapping and translation of memory addresses and commands between the first and second hosts, allowing unused-allocated-DRAM on the first host to be utilized by a process running on the second host. The mapping may be implemented in various ways. In one approach, the resource composer utilizes a custom memory management unit (MMU) containing dedicated page tables that map specific physical page frames on the first host to allocated virtual memory pages usable by the process on the second host. For instance, the MMU contains an entry for each physical page frame in the first host, which includes the corresponding virtual address on the second host. Alternatively, the MMU on the second host may be configured by the resource composer with additional entries to map remote physical pages to local virtual pages.

In the context of the previously described embodiment, the resource composer is an integral component that significantly contributes to the efficient utilization of DRAM. In some embodiments, the resource composer includes a switch, which provides additional functionalities in terms of memory management and address translation. In one example, the resource composer is responsible for configuring the input/output memory management unit (IOMMU)

or memory management unit (MMU) located on the second host with additional entries to map remote physical pages, located in the DRAM of the first host, to local virtual pages accessible by the second host. This mapping may facilitate seamless access to the memory resources, irrespective of their physical location in the distributed system.

In another example, the resource composer leverages CXL's Address Translation Services (ATS) to intercept memory access requests originating from the second process P2. Upon interception, ATS translates the virtual addresses specified in the requests to the corresponding physical addresses on the first host. This translation directs the memory access requests to the correct memory locations, thereby maintaining data integrity and consistency across the system. For example, if the second host requests a memory address that corresponds to a range that has already been allocated on the first host, the ATS could intercept the request and redirect it to the first host. In still another example, the resource composer may utilize CXL's Segment Translation Services (STS) to optimize memory utilization. STS is employed to define segments of unused physical pages on the first host, effectively categorizing them as a global space. Once categorized, this global space is then mapped to a local space that is readily accessible to the second process P2 on the second host. This mapping enables some of the unused DRAM to be repurposed and made accessible to other processes in the system, optimizing memory utilization. Through the integration of these advanced memory management and address translation mechanisms, this embodiment enables efficient utilization of DRAM across distributed computing environments, contributing to enhanced performance and resource utilization.

The translation, based on the map, of the CXL.mem commands to CXL.cache commands may also be implemented in various ways. One approach for command translation may utilize a table to track mappings between logical pages on the second host and physical pages on the first host. The resource composer uses this table to convert memory read, write and other commands between the CXL.mem format used by the second host process and the CXL.cache format required to access the physical memory on the first host. For example, a CXL.mem read command may translate to a CXL.cache read command, which contains the data relevant to the first host. Alternatively, the resource composer may employ caching of recent address translations and command conversions in a translation lookaside buffer (TLB), which avoids maintaining a complete table. Another alternative is to perform inline on-demand translation when commands are received from the second host process, using ATS or STS in CXL to map addresses just-in-time. In one example, the resource composer receives a CXL.mem read command referencing a logical address from P2, looks up the corresponding physical address on the first host, and issues a CXL.cache read command to read the data from memory on the first host. The data is returned in a CXL.cache read response, converted to a CXL.mem format, and sent back to P2 on the second host.

To further optimize the utilization of DRAM in a distributed environment, the embodiment may encompass an additional layer of functionality by integrating one or more additional hosts into the system. For example, a third host (which may represent multiple hosts), connected to the resource composer via CXL, is configured to run a third PCE (PCE3). A kernel module running on the third host gathers and provides the resource composer with information about a third process (P3) running in PCE3, which includes values from the page table and the process control block of P3. Utilizing this data, the resource composer is equipped to make informed decisions about the memory usage patterns of P3. Specifically, the resource composer analyzes the received data to determine if P3 has not accessed a portion of its allocated address space, mapped to a specific set of page frames, for a defined duration, which may indicate that the memory is unused and can be reallocated. The resource composer may utilize CXL.cache protocol to remap the identified set of page frames, originally allocated to P3, to the address space of P2 running in PCE2 on the second host.

In addition to optimizing unused memory, the resource composer may also exhibit proactive behavior in response to access attempts by processes. Specifically, when PCE1 attempts to access a portion of its address space, the resource composer receives an indication of this activity and dynamically maps the relevant page frames back to the portion of P1's address space, ensuring uninterrupted and seamless access for P1.

To facilitate the previously mentioned remapping processes, especially the mapping of certain page frames to the address space of P2, the resource composer may perform data management steps beforehand. The resource composer may remove existing mappings between the certain page frames and the address space of P1 and then erase the data stored in these page frames, ensuring that they are clean and ready for reallocation. Taking data integrity and potential future needs into account, the resource composer may flush the data stored in these page frames to another location, which could be a memory segment featuring longer latency, or external storage devices such as a flash drive or a hard disk drive. This flushing ensures that valuable or needed data is not lost, but is instead securely archived for potential future retrieval or analysis.

Memory compression, also known as RAM compression, can be implemented in hardware (e.g., using a dedicated ASIC and/or FPGA), in software (e.g., using algorithms such as zswap or zram), and/or as a hybrid hardware-software solution. In one example, the range of the compressed virtual memory is marked inaccessible so that attempts to access the compressed memory pages trigger page faults that trigger decompression and/or allocation of page frames for memory that was not in used.

Building upon the established framework of utilizing unused DRAM across multiple hosts, the embodiment may extend its capabilities by incorporating the CXL.io protocol. In one example, one or more additional hosts, such as a third host, seamlessly integrated into the system via CXL and configured to run a third PCE (PCE3). A kernel module running on the third host gathers information about a third process (P3) running in PCE3. This information, including values from P3's page table and process control block, is relayed to the resource composer. Utilizing this data, the resource composer evaluates the memory usage patterns of P3, and determines whether P3 has, for a specified duration, not been using a portion of its address space mapped to a distinct set of page frames. Identifying unused memory, the resource composer may proceed to optimize resource allocation utilizing the CXL.io protocol to remap the identified set of page frames to the address space of the second process (P2) running in PCE2 on the second host. Additionally or alternatively, the resource composer may translate CXL.mem commands, utilized for communication within the system, to CXL.io commands. Furthermore, it may leverage a custom IOMMU containing dedicated page tables that map specific physical page frames located on the first host to allocated virtual memory pages accessible and usable by the second process (P2), ensuring efficient memory utilization process.

Optionally, before proceeding with the mapping of certain page frames to the address space of P2, the resource composer takes the preemptive measure of marking the relevant portion of P1's address space as inaccessible to safeguard against unintended access during the remapping process. Should there be an attempt by P1 to access this relevant portion of its address space, the resource composer is primed to respond. Upon receiving an indication of such an access attempt, it acts swiftly to remap page frames back to the relevant portion of P1's address space to ensure uninterrupted access for P1, maintaining consistency and stability in the system's operation.

The resource composer's responsiveness may extend to scenarios where P1 attempts to access a different portion of its address space. In such cases, the resource composer evicts and erases the data stored in the certain page frames previously mapped to P2, ensuring that the space is cleared and ready for reallocation. Following this, it proceeds to map the cleared page frames back to P1's address space, optionally utilizing CXL.mem commands to facilitate this transition. This responsive approach ensures that the DRAM is efficiently utilized while maintaining relatively quick adaptability to the processes' varying memory access patterns.

Some embodiments utilize one or more kernel modules. The kernel module, which in some cases may also be referred to as a driver, runs within the hypervisor on the host (such as the first host) and interfaces with the OS/hypervisors managing the PCEs. It provides the resource composer with various data about a VM and/or container running on the host for the purpose of detecting unused-allocated-memory. In one embodiment, the kernel module periodically reads the page table of P1, which stores the mapping between memory pages (virtual addresses) used by P1 and their corresponding page frames (physical addresses) pointing to DRAM on the first host. It also reads P1's process control block from the OS process table, which contains metadata like the state of P1. The kernel module and/or the resource composer may compare the current page table mappings and process state over time to determine if a certain subset of P1's virtual address space and the corresponding physical page frames have not been accessed or used for a certain duration while P1 continues running. For example, the kernel module and/or the resource composer may detect no read/write activity to certain page table entries mapped to certain page frames over a period of time based on accessed bits or other tracking means. Optionally, the kernel modules may also read the thread control blocks, which store information needed to manage the threads. The kernel module communicates the information about the unused physical memory to the resource composer, which then, referring to the above embodiment, may remap the unused page frames to virtual address space allocated to P2 on the second host. Optionally, the remap may be implemented by applying a technique such as custom MMU mapping, custom MMU mappings, address translation service, segment translation service, and/or partition translation service. Optionally, page access permissions are updated appropriately to grant P2 access, such that the remapping enables the unused DRAM on the first host to be utilized by P2 running of the second host.

The kernel module provides information regarding the access patterns of page tables, facilitating understanding of memory utilization. This information may subsequently undergo processing by a variety of entities, including but not limited to the kernel module itself, the resource composer, the hosts, and/or a switch. The system may be versatile, with the capability to process the information gleaned from the kernel module through various entities and/or devices implemented by software, firmware, and/or hardware components. Optionally, the kernel module may go beyond its conventional role, taking on some responsibilities typically associated with the resource composer. By implementing parts of the resource composer's functionality, the kernel module actively participates in the processing of information, contributing to the efficient management of memory resources. This collaborative approach between the kernel module and the resource composer may enhance the system's overall capability to optimize memory utilization, such as ensuring that unused-allocated-DRAM is effectively repurposed.

For example, consider a scenario where the page tables are structured as a radix tree, with some entries assigned to physical memory while others remain unassigned. Navigating this structure to locate physical memory can be a time-consuming task, necessitating exhaustive search efforts. A solution to this challenge may include a preprocessing step, conducted by the kernel module or another designated entity, which scans the page tables to extract only those entries mapped to physical memory and pertinent to the current processing task. This extracted information is then reorganized into a more compact table, significantly reducing the volume of data requiring processing. This streamlined approach improves the system's efficiency in navigating the memory landscape, optimizing performance, and reducing latency. In a second example, the kernel module is configured to extract valuable heuristics from the operating system, leveraging calculations performed over an extended period. These internal heuristics, once obtained, serve to simplify the processing tasks undertaken by the resource composer. By utilizing these pre-calculated heuristics, the system may be able to reduce the complexity of its operations, enhance efficiency and improve memory utilization.

Figure 13:
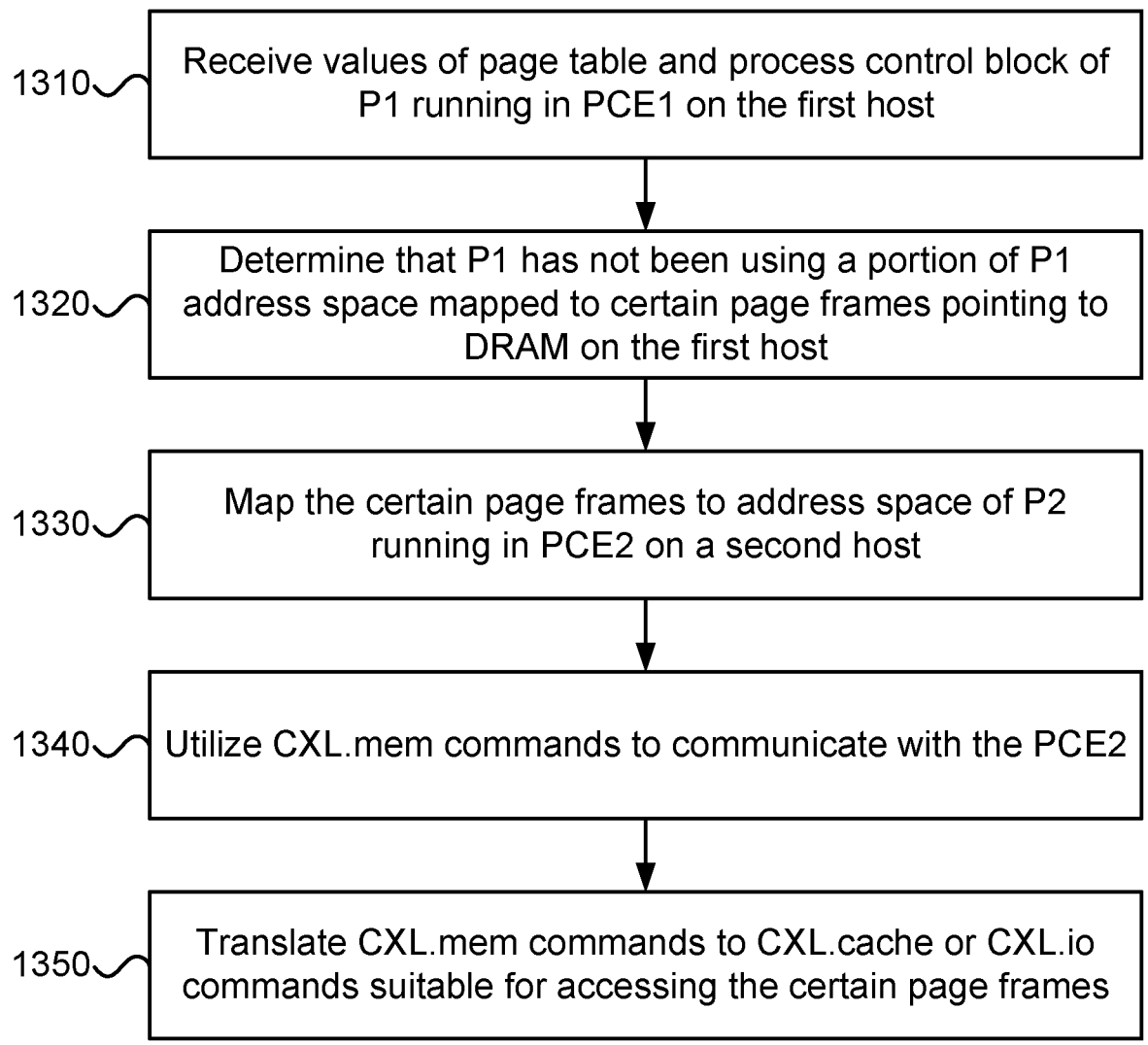
FIG. 13 illustrates one embodiment of a method for efficiently utilizing underutilized-allocated DRAM in a computing environment.

In accordance with one embodiment illustrated in FIG. 13, a method for efficiently utilizing unused-allocated DRAM in a computing environment is provided. This method enhances memory utilization across different hosts and packaged computing environments (PCEs), ensuring optimal use of available DRAM. The method involves a series of steps, optionally executed by the resource composer, which works in conjunction with one or more kernel modules running on the host(s). In step 1310, the resource composer receives information from a kernel module operating on the first host. The received data includes values from the page table and the process control block of a first process (P1), which is actively running in a first packaged computing environment (PCE1) on the first host. This information provides insight into the memory utilization patterns of P1, paving the way for reusing certain portions of the DRAM. Moving to step 1320, the resource composer processes the received values to decide about the memory usage of P1. Specifically, it assesses whether P1 has not been using a portion of its allocated address space, mapped to certain page frames pointing to DRAM on the first host, for a specified duration. This step identifies opportunities for reallocating unused DRAM, ensuring that available memory resources are utilized to their fullest potential. Upon identifying the unused DRAM, the method progresses to step 1330, where the resource composer maps the certain page frames, previously allocated to P1 but found to be unused, to the address space of a second process (P2). P2 operates within a second packaged computing environment (PCE2) located on a second host. This remapping of resources enables the system to make efficient use of DRAM, reducing wastage and enhancing overall system performance. With the remapping complete, the method advances to step 1340, where the resource composer utilizes CXL.mem commands to facilitate communication with PCE2. And in step 1350, the resource composer translates the CXL.mem commands, based on the previous mapping, to either CXL.cache or CXL.io commands. This translation ensures that the commands are in the correct format for accessing the certain page frames, now allocated to P2, which enables P2 to effectively utilize the DRAM, previously unused by P1, enhancing the efficiency of memory utilization across the system.

In one embodiment, a non-transitory computer readable medium is utilized to store data comprising instructions that, when executed, facilitate the innovative method of optimizing DRAM utilization across multiple hosts and packaged computing environments. The instructions stored on this medium enable a computer, such as the resource composer, to perform several key operations aimed at improving memory efficiency. The initial operation involves receiving values from a page table and process control block of a first process (P1) running in a first packaged computing environment (PCE1) on a first host. These values provide insight into the memory usage patterns of P1. Following this, the resource composer determines whether P1 has been neglecting a portion of its allocated address space, which is mapped to certain page frames pointing to DRAM on the first host, for a specified duration. Identifying unused DRAM is a critical step in optimizing memory utilization. Subsequently, the resource composer maps these identified page frames, previously allocated but unused by P1, to the address space of a second process (P2) running in a second packaged computing environment (PCE2) on a second host. To facilitate communication with PCE2 and ensure that P2 can effectively utilize the remapped DRAM, the resource composer utilizes CXL.mem commands. Finally, based on the mapping, the resource composer translates these CXL.mem commands to CXL.cache or CXL.io commands, ensuring that they are in the correct format for accessing the certain page frames now allocated to P2.

The following description discusses another embodiment which addresses the need to utilize DRAM on remote hosts by leveraging CXL to interconnect a memory pool unit with first and second hosts, facilitating efficient memory access and utilization. The system includes a memory pool unit, first and second hosts, and packaged computing environments (PCEs). The memory pool unit includes a relatively large amount of memory, greater than 64 GB of DRAM, providing a substantial memory reserve. The memory pool is coupled to the first and second hosts via CXL, ensuring high-speed and reliable communication. The memory pool may include complete capabilities of a switch, partial capabilities of a switch that are enough for its operation, or operate in coordination with a switch.

Each of the first and second hosts is equipped with a relatively large amount of memory, greater than 32 GB of DRAM, ensuring they have adequate memory resources for various computing tasks. These hosts are designed to concurrently run numerous programs, termed as the first and second packaged computing environments (PCE1 and PCE2) respectively, while maintaining flexibility in the number of PCEs they can support. These PCEs exhibit versatility, capable of encompassing either a container or a virtual machine, tailoring to the distinct demands of various applications and system necessities. PCE2 is configured to access a memory region as if it is directly located in the memory pool. This is achieved utilizing the CXL.mem protocol, which facilitates direct memory access, enhancing speed and efficiency. The memory pool, on the other hand, is configured to create this memory region based on two sources of DRAM: (i) DRAM located on the memory pool itself, accessed utilizing CXL.mem, and (ii) DRAM located on the first host, and optionally other hosts and/or other memory pools, accessed utilizing either CXL.cache or CXL.io protocols. This configuration ensures that the system can utilize available DRAM resources, whether they are located on the memory pool or on remote hosts, such as the first host. By doing so, the system enhances memory utilization by reducing the constraints resulting from the physical location of the DRAM within the system.

The memory pool in the system, integral for managing and allocating DRAM across different hosts, incorporates a switch and address mapping tables for directing memory access requests originating from PCE2 to various memory sources. These address mapping tables may be designed at different levels of granularity. In a first example, a uniform granularity fixed page mappings ensures a consistent and predictable allocation of memory space. In another example, a non-uniform granularity allows for mappings of memory chunks of varying sizes. Selecting the proper memory granularity improves the ability of the system to be both precise and flexible, catering to different types of memory access patterns and requirements.

Optionally, to further enhance the system's capability, a single virtual memory space may be seamlessly partitioned into memory chunks. Each of these chunks is then mapped to a distinct memory source, which could be either the memory pool itself or other hosts that are connected to the memory pool. This transparent partitioning and mapping enables the system to efficiently manage and allocate memory, even when it is located at different physical locations.

In one embodiment, the system is designed such that there are essentially no constraints on the physical address space of the memory region. This results in a level of transparency where the memory region is essentially completely transparent to PCE2 and generally transparent to other software layers. Consequently, PCE2 is able to consume the memory region in a manner that is analogous to consuming local memory, despite the fact that the memory may be physically located on remote hosts. One benefit of this transparency is that some systems may be used seamlessly without requiring significant changes to existing software or applications.

Optionally, the memory pool includes a resource composer that interfaces with the first host to optimize memory utilization. The resource composer is configured to interact directly with a kernel module running on the first host, where it receives critical information related to the memory usage of a first process (P1) running in the first packaged computing environment (PCE1). This information includes values from the page table and the process control block of P1. Utilizing the received values, the resource composer performs an analysis to determine the memory usage patterns of P1 to identify if there has been a portion of the address space of P1 that has not been in use for a specified duration, wherein this portion is associated with certain page frames pointing to DRAM located on the first host. Once the unused memory is identified, the resource composer may proceed to map at least some of these identified page frames to the address space of the memory region through the utilization of CXL.cache or CXL.io protocols.

In a further optional enhancement of the above embodiment, the resource composer may be configured to receive indications that highlight unused-allocated-DRAM located on the first host. These indications are used in creating at least a portion of the memory region, mapping the unused-allocated-DRAM to an address space that is readily accessible by PCE2. The resource composer receives values of the page table and the process control block of P1 from a kernel module running on the first host. Through analysis of these values, it determines portions of P1's address space that are mapped to certain page frames, pointing to the unused-allocated-DRAM on the first host. To facilitate efficient memory utilization, the resource composer may employ a custom MMU containing dedicated page tables designed to map the unused-allocated-DRAM on the first host to allocated virtual memory pages. These pages may then be made usable by a second process (P2), running in the second packaged computing environment (PCE2).

Alternatively, the resource composer may leverage CXL's Address Translation Services (ATS) to apply precise mapping between the unused-allocated-DRAM on the first host and the address space allocated to PCE2. This is achieved by intercepting memory access requests from PCE2 and translating the virtual addresses to the corresponding physical addresses of the unused-allocated-DRAM on the first host, ensuring accurate and efficient memory mapping.

Optionally, the memory pool includes a translation module for translating CXL.mem commands, which are received from the PCE2, into corresponding CXL.cache commands that are then directed to the DRAM on the first host. The translation module may be implemented through a variety of software, firmware, and/or hardware combinations, providing flexibility and adaptability to suit different system configurations and performance requirements. The implementation of the translation module can range from being fully integrated into hardware, partly implemented in software running on a processor, or a combination of both, depending on the desired balance between speed, cost, and flexibility.

Optionally, to enhance the efficiency of the translation process, the translation module may utilize a table that tracks the mappings between virtual addresses referenced in the CXL.mem commands and the physical addresses of the DRAM located on the first host. Additionally or alternatively, the translation module may be configured to employ a translation lookaside buffer (TLB) that stores recent translations between virtual addresses used in the CXL.mem commands and the physical addresses on the first host. By caching these recent translations, the translation module may be able to perform the necessary translations without the need to maintain a complete mapping table, resulting in a more efficient and faster response time. In still another alternative, when the translation module receives a CXL.mem read command that references a specific virtual address from PCE2, it may look up the corresponding physical address on the first host and issues a CXL.cache read command to retrieve the required data from the DRAM. Once the data is obtained, the translation module converts the CXL.cache read response back into the CXL.mem format and sends this response back to PCE2. This ensures that PCE2 receives the requested data in a format it understands, maintaining seamless operation and data integrity.

Optionally, the memory pool is further configured to maintain data coherency between its own DRAM and the DRAM of the first host that is utilized to create the memory region presented to PCE2. This enables a consistent view of the aggregated memory space. Specifically, the memory pool can implement a coherency protocol that tracks the status of data accessed from both memory pools. It utilizes CXL coherence commands, such as read for ownership or recall, to coordinate and synchronize data across the two DRAM sources. The memory pool can snoop, or monitor, memory transactions to check for conflicting accesses. Based on this monitoring, it ensures coherency of data between its DRAM and the first host DRAM. Additionally, the memory pool can maintain metadata, such as a directory-based cache coherence directory, indicating the current cached state of data copies distributed across the two DRAM sources. These capabilities collectively enable the memory pool to present a unified and coherent memory space to PCE2 by coordinating the two underlying sources of physical memory.

In another alternative implementation of the embodiment, the memory region accessible by PCE2 spans a contiguous address space comprising both a first subset of virtual addresses that map to physical addresses on the DRAM of the memory pool, and a second subset of virtual addresses that map to physical addresses on the DRAM of the first host. This provides PCE2 with a unified view of the memory region, spanning both the local DRAM of the memory pool and the remote DRAM of the first host, such that from PCE2's perspective the memory region appears as a single contiguous address space even though it is backed by multiple physical DRAM sources.

Additionally or alternatively, the DRAM of the first host utilized for the memory region may be accessed by the memory pool using CXL.cache read/write commands to access cache lines in the first host DRAM. The memory pool may leverage snooping features of the CXL.cache protocol to monitor memory transactions to the first host DRAM to allow the memory pool to maintain coherency between its own local DRAM and the remotely accessed DRAM of the first host. The snooping and monitoring of accesses to both DRAM sources enables the memory pool to coordinate and synchronize the state of data across the unified memory region.

Figure 14:
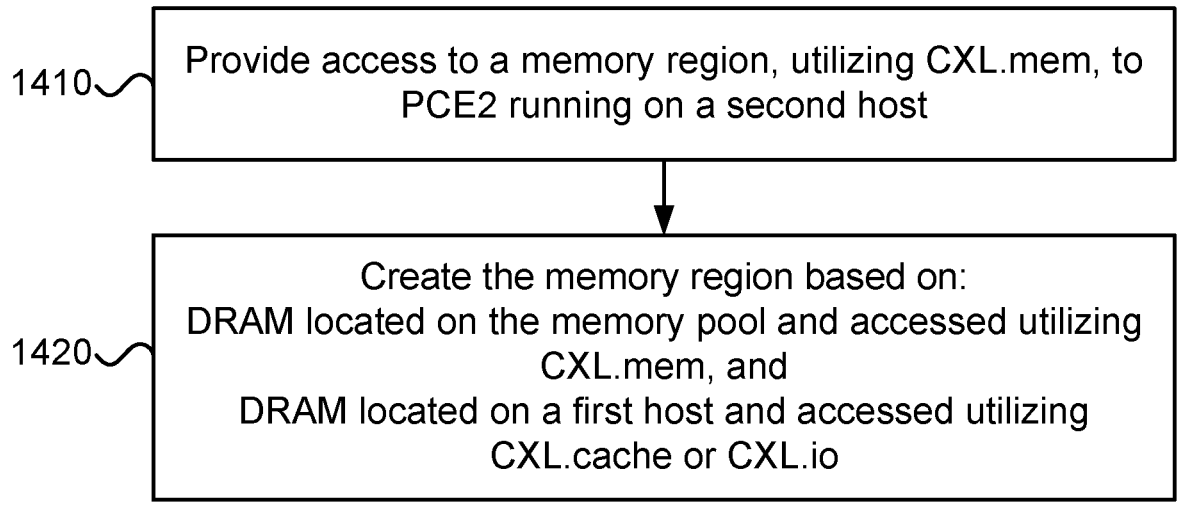
FIG. 14 illustrates one embodiment of a method for utilizing DRAM on remote hosts.

In accordance with one embodiment illustrated in FIG. 14, a method for utilizing DRAM on remote hosts is provided. The method, involving a series of steps executed by a computer, utilizes distributed DRAM across various hosts, ensuring efficient memory utilization and seamless access. In step 1410, a memory pool, which is characterized by its substantial DRAM capacity of at least 64 GB extends its capabilities to a second packaged computing environment (PCE2), which operates on a secondary host equipped with a minimum of 32 GB of DRAM. Through the utilization of CXL.mem protocol, the memory pool provides the PCE2 with access to a specific memory region, such that from the perspective of the PCE2 the memory region is perceived as if it is directly located within the confines of the memory pool. This perception is maintained despite the actual physical distribution of the DRAM. And in step 1420, the memory pool is leveraging DRAM from two distinct sources. The first source is the DRAM that is physically situated within the memory pool, accessible through the CXL.mem protocol. The second source incorporates DRAM from a first host, which includes at least 32 GB of DRAM, and is accessed via either the CXL.cache or CXL.io protocols. The memory pool maintains connection to both the first and second hosts via CXL. This method demonstrates the memory pool's ability to act as a central hub, integrating and managing DRAM resources from multiple hosts and presenting them in a unified manner to the PCE2.

The following embodiment enables unused allocated DRAM to be utilized as a high-performance logical NVMe storage device. The system includes a first host, a second host, and a resource composer coupled via CXL. The first and second hosts run packaged computing environments (PCEs) such as containers or virtual machines. The resource composer detects when a first PCE (PCE1) on the first host has not been utilizing a portion of its allocated DRAM frames for a certain duration. It then creates or accesses a logical NVMe device, and maps at least some of those unused DRAM frames to the logical NVMe device using CXL.cache or CXL.io protocols, which enables the unused DRAM to be exposed as fast NVMe storage. Finally, the resource composer allocates the logical NVMe device to a second PCE (PCE2) running on the second host. PCE2 can then access and utilize the unused remote DRAM as a local high-speed block storage device. This allows unused DRAM on the first host to be repurposed efficiently.

Referring to the figures, the memory pools 140 and 170 have been configured to engage in bi-directional communication via the integration of CXL Fabric capabilities. This includes the potential utilization of the CXL Fabric Manager, which is designed to facilitate and streamline the communication process. CXL Fabric essentially defines and orchestrates the interactions between various switches, thereby establishing a cohesive and efficient CXL fabric topology. This topological framework enables the switches associated with memory pool 140 and memory pool 170 to communicate seamlessly with one another.

Additionally or alternatively to CXL Fabric, memory pool 140 may establish a connection with memory pool 170 using the CXL.cache protocol or the CXL.io protocol. In scenarios where these protocols are employed, memory pool 140 effectively assumes the role of a host when interfacing with memory pool 170. This host-like behavior is leveraging the capabilities of CXL.cache or CXL.io for tasks related to memory allocation. Following the establishment of this connection, memory pool 140 proceeds to implement address mapping techniques to create an address space that is mapped to the memory reserves within memory pool 170.

Another alternative communication pathway exists, wherein memory pool 140 and memory pool 170 can interact via the CXL.mem protocol. In this configuration, memory pool 140 once again adopts a host persona when communicating with memory pool 170, thereby facilitating memory allocation activities through the CXL.mem protocol. CXL.mem protocol is unidirectional, hence there is a provision for memory pool 170 to reciprocate by presenting itself as a host to memory pool 140 over a distinct CXL link. This reciprocal hosting arrangement ensures bidirectional communication, even with the unidirectional nature of CXL.mem. Upon establishment of this connection, memory pool 140 employs a first address mapping to generate a corresponding first address space mapped to the memory in memory pool 170, and optionally, memory pool 170 can employ a second address mapping, resulting in the generation of a second address space, this time mapped to the memory in memory pool 140. In essence, this embodiment underscores the versatility and efficiency of memory pool communication, facilitated through the use of standard CXL Fabric capabilities and a variety of CXL protocols, enabling robust and flexible memory allocation and addressing solutions.

Optionally, the PCE2 runs an NVMe driver configured to communicate with the logical NVMe device representing the unused allocated DRAM. The resource composer runs an interface between the NVMe commands received from the PCE2's NVMe driver and the corresponding CXL.cache or CXL.io commands directed to the first host to access the physical DRAM frames. This abstraction provided by the resource composer allows the PCE2 to interact with the unused remote DRAM using standard NVMe commands. Additionally, the first host may assist in this abstraction by translating the CXL.cache or CXL.io commands received from the resource composer into normal memory transactions to access the physical DRAM frames. The first host may utilize its memory management unit (MMU) to translate the logical addresses in the CXL commands to the physical addresses used by the DRAM controller on the first host, which enables the unused DRAM to be accessed using memory-semantic CXL commands.

Optionally, the resource composer utilizes CXL.cache protocol when mapping the unused DRAM frames to the logical NVMe device presented to PCE2. CXL.cache executes coherent load and store commands, which ensures cache coherence between the physical DRAM frames on the first host and the logical NVMe device accessed by PCE2. The load and store operations via CXL.cache synchronize data across the two entities to maintain a consistent view of the memory space. Additionally, the resource composer may execute the load operation per memory semantics of CXL.cache in order to properly maintain cache coherency. The store operation is likewise executed under CXL.cache memory semantics to ensure the DRAM on the first host and the logical NVMe device remain coherent. This provides a consistent view of the repurposed DRAM memory between the physical device on the first host and the logical device accessed by PCE2. In another embodiment, the resource composer may leverage the CXL.cache layer to facilitate coherent and consistent access to the shared memory space represented by the logical NVMe device. The CXL.cache layer is optimized for workloads with frequent memory accesses. By mapping the logical NVMe using CXL.cache, the resource composer enables efficient memory-semantic access that can fully utilize the performance of the unused DRAM.

Optionally, a third host comprising at least 32 GB of DRAM may be coupled to the resource composer via CXL. If the resource composer receives an indication that PCE1 is attempting to access the portion of its address space that was mapped to the logical NVMe device, the resource composer can dynamically map some of the DRAM frames on the third host to that portion of PCE1's address space using CXL.cache or CXL.io, which allows the resource composer to quickly reallocate unused DRAM capacity across multiple hosts.

Optionally, the resource composer can utilize CXL.io protocol when mapping the unused DRAM frames to the logical NVMe device presented to PCE2. CXL.io executes block read and block write commands that enable efficient block-level transfers between the physical DRAM on the first host and the logical NVMe device. Optionally, the block read and write operations facilitate high-throughput data transfers such as bulk transfers, streaming operations, or backup processes. The block read corresponds to a PCIe Memory Read Transaction Layer Packet used to read larger contiguous memory segments. Similarly, the block write corresponds to a PCIe Memory Write TLP used for writing larger contiguous segments. Optionally, by leveraging CXL.io, the mapping and presentation of the unused DRAM as a logical NVMe device can support efficient streaming, backups, etc. which require block-level operations. This allows the repurposed memory to suit different application needs. Optionally, the resource composer may utilize the CXL.io layer to prioritize high throughput data transfers between the physical DRAM and the logical NVMe device. The CXL.io layer supports efficient data movement without strict cache coherency. This further expands the types of workloads that can benefit from the unused remote DRAM.

Optionally, the system includes a resource composer, which is integrated within a memory pool unit that is equipped with a minimum of 32 GB of DRAM, and also includes a switch. The resource composer has the capability to utilize CXL to establish a mapping of at least a portion of the DRAM available within the memory pool unit to a logical NVMe device, which allows for a more efficient utilization of DRAM resources, contributing to the overall effectiveness of the system in managing memory.

Optionally, the system can also be configured to include a memory pool unit, which comprises at least 32 GB of DRAM and a switch. This switch is designed to facilitate connections between the first host, the second host, the resource composer, and the memory pool unit itself. In this arrangement, the resource composer is configured to utilize the CXL.mem protocol to map at least a portion of the DRAM within the memory pool to the logical NVMe device. This enables an efficient allocation of DRAM resources and facilitates the utilization of the logical NVMe device by the system.

Optionally, the system may incorporate a switch, which is configured to establish connections between the first host, the second host, and the resource composer. Within this configuration, the resource composer is further configured to manage memory allocation across multiple hosts, which ensures that the memory resources are better utilized, contributing to the overall performance and efficiency of the system.

Optionally, the system may further include a switch, configured to establish connections between the first host, the second host, and the resource composer. In this embodiment, the switch is configured to dynamically allocate bandwidth based on the specific requirements of the packaged computing environments that are running on the hosts. This dynamic allocation of bandwidth enables the system to efficiently manage its resources, adapting to the varying needs of the computing environments and contributing to the optimal performance of the system.

Figure 15:
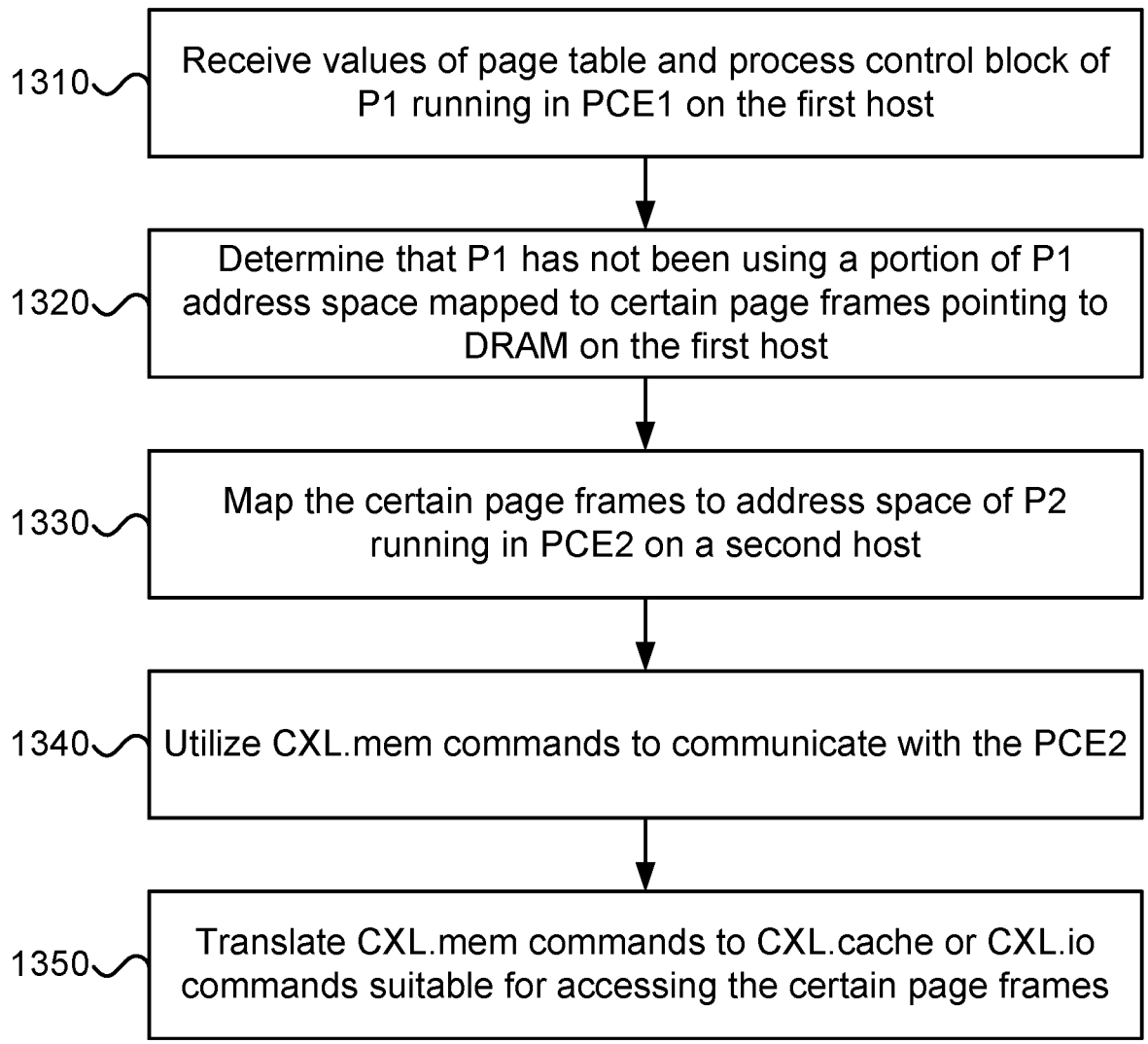
FIG. 15 illustrates an embodiment of a method for utilizing underutilized-allocated-DRAM as a logical NVMe device.

In accordance with one embodiment illustrated in FIG. 15, a method for utilizing unused-allocated-DRAM as a logical NVMe device is provided. This method, involving a series of steps executed by a computer, repurposes unused DRAM, transforming it into a logical NVMe device that can be utilized by different packaged computing environments across multiple hosts. In step 1510, the process initiates with the resource composer's active monitoring of the first packaged computing environment (PCE1), which is operational on a first host. The resource composer's task is to detect periods of inactivity, identifying when a specific portion of the PCE1's address space, which has been previously mapped to certain page frames pointing to DRAM on the first host, has not been utilized for a predetermined duration. The first host, a secondary host, and the resource composer are interconnected via CXL. In step 1520, the resource composer is either creating or accessing a logical NVMe device, providing an abstraction layer that facilitates the mapping and utilization of the unused DRAM. In step 1530, the resource composer utilizes the capabilities of CXL.cache or CXL.io protocol to map at least some of the previously identified page frames, which are associated with the unused portion of the PCE1's address space, to the logical NVMe device. This mapping transforms the unused DRAM into a resource that is readily accessible and usable. And in step 1540, the resource composer completes the process by allocating the logical NVMe device to the second packaged computing environment (PCE2), which is actively running on the secondary host. This allocation is done in such a manner that the PCE2 can seamlessly interact with the logical NVMe device, utilizing it as if it were a native resource.

The following are short descriptions of the figures.

FIG. 1 illustrates a System Overview with Memory Pool, switch, and Logical NVMe Device FIG. 1 provides a system schematic, illustrating a memory pool integrated with a switch, and a logical NVMe device interfaced with a packaged computing environment (PCE) and an NVMe device/pool. In this figure, the logical NVMe device is depicted as having direct connections to both the PCE 140 and the NVMe device/pool 150, showcasing the various potential interaction paths within the system.

Figure 2:
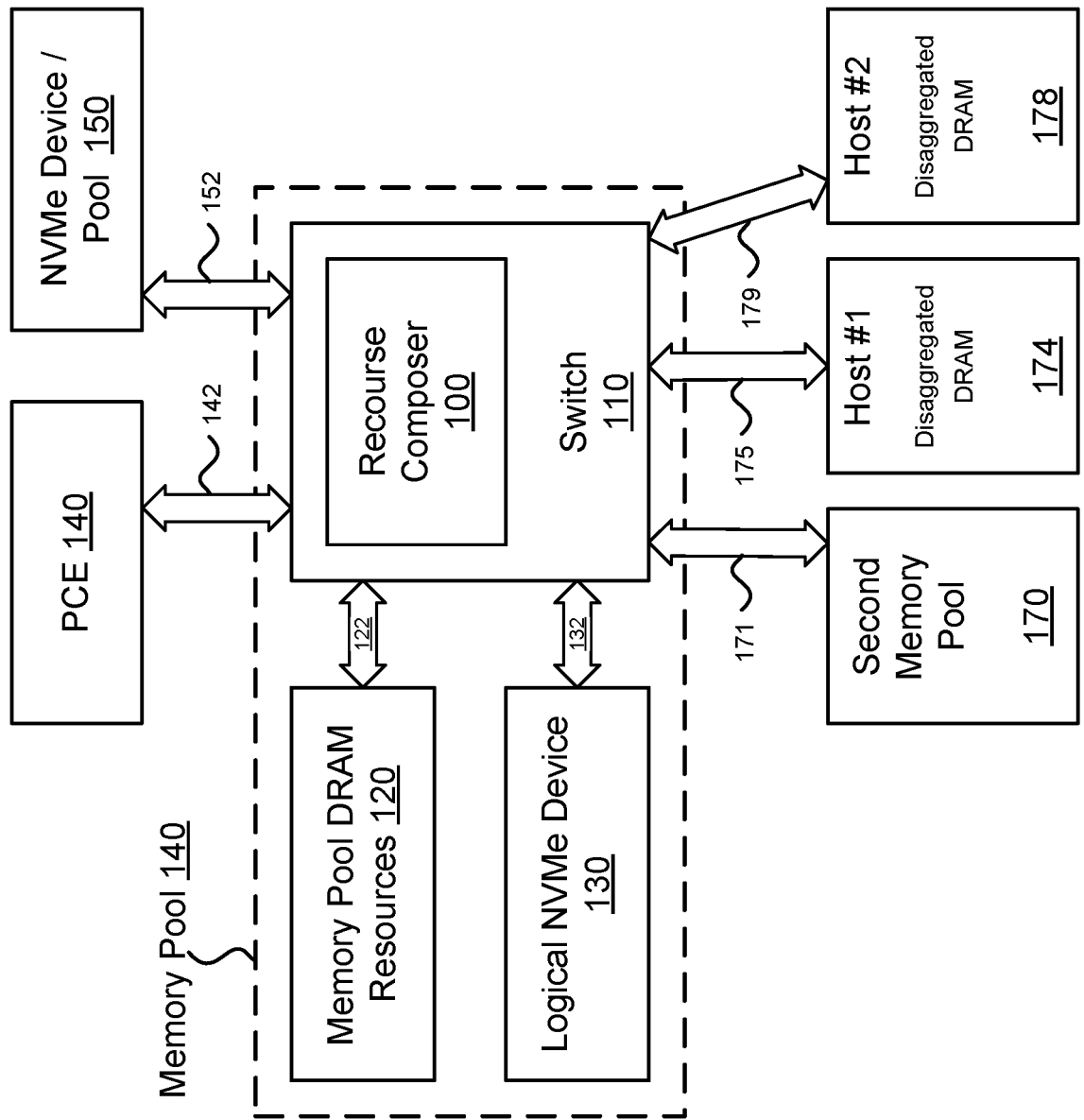
FIG. 2 illustrates System view showing a Memory Pool with switch and switch-integrated Resource Composer.

FIG. 2 illustrates a System Architecture Featuring a Memory Pool, switch, and Integrated Resource Composer. This figure presents a comprehensive view of the system, highlighting the inclusion of a memory pool, switch, and a resource composer that is seamlessly integrated within the switch. In this setup, all communication flows between the system's components are routed through the switch. Unlike the configuration in FIG. 1, the logical NVMe device is not directly connected to the PCE 140 or the NVMe device/pool 150. Instead, all interactions are mediated by the switch, emphasizing the central role of the switch in this particular system architecture.

Figure 3:
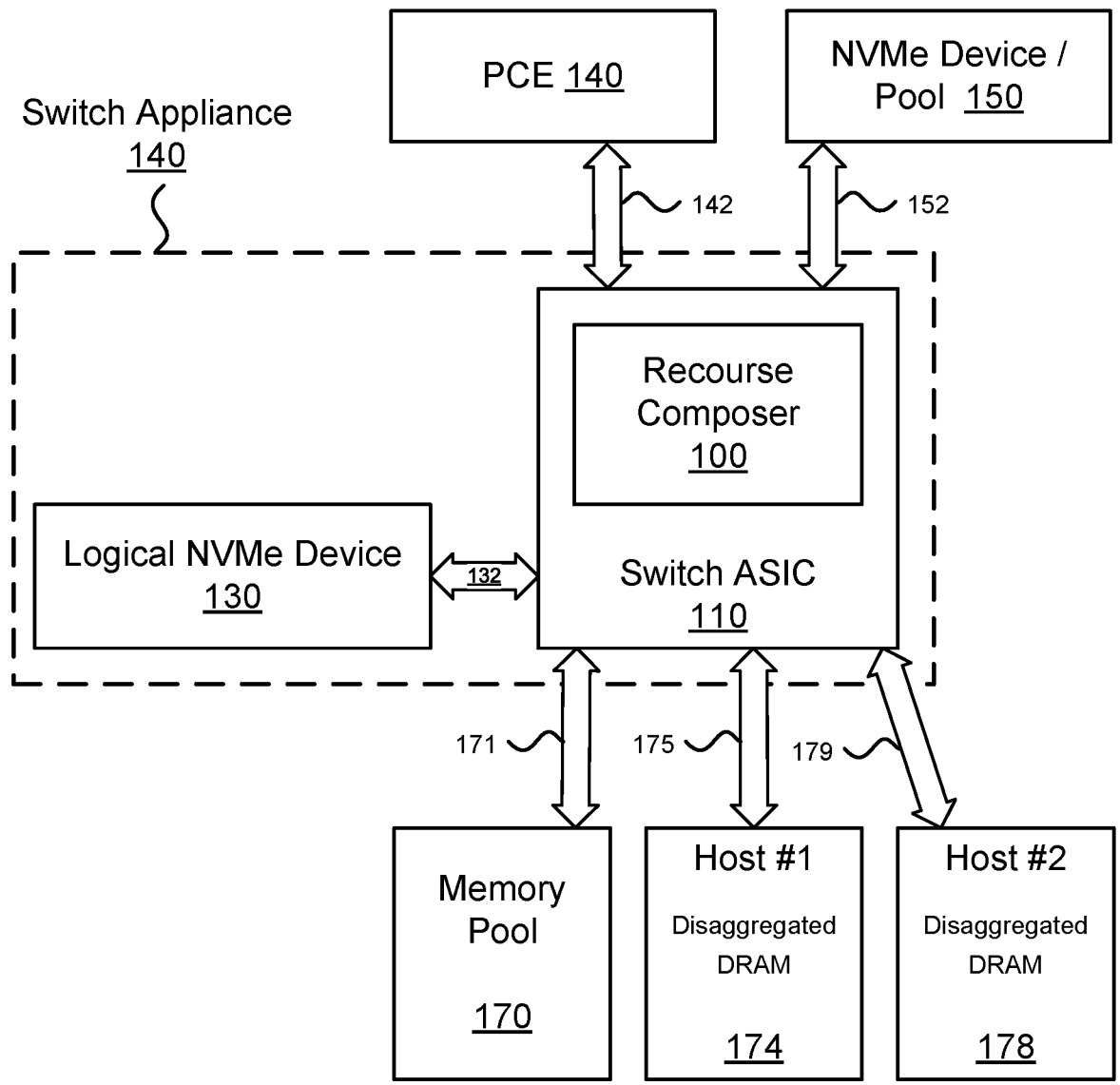
FIG. 3 illustrates System view showing a switch Appliance with a Resource Composer tightly integrated within a switch ASIC and a separate Logical NVMe Device.

FIG. 3 illustrates a switch Appliance with Integrated Resource Composer and Standalone Logical NVMe Device. This illustration focuses on a switch appliance, wherein the resource composer is tightly integrated within the switch ASIC, effectively creating a smart switch with enhanced capabilities. Notably, the logical NVMe device is portrayed as a separate entity, distinct from both the resource composer and the switch. This configuration highlights the flexibility in the system design, allowing for various hardware or software components, or a combination thereof, to fulfill the role of the logical NVMe device. The switch appliance serves as the housing for these integral components, creating a compact and efficient system.

Figure 4:
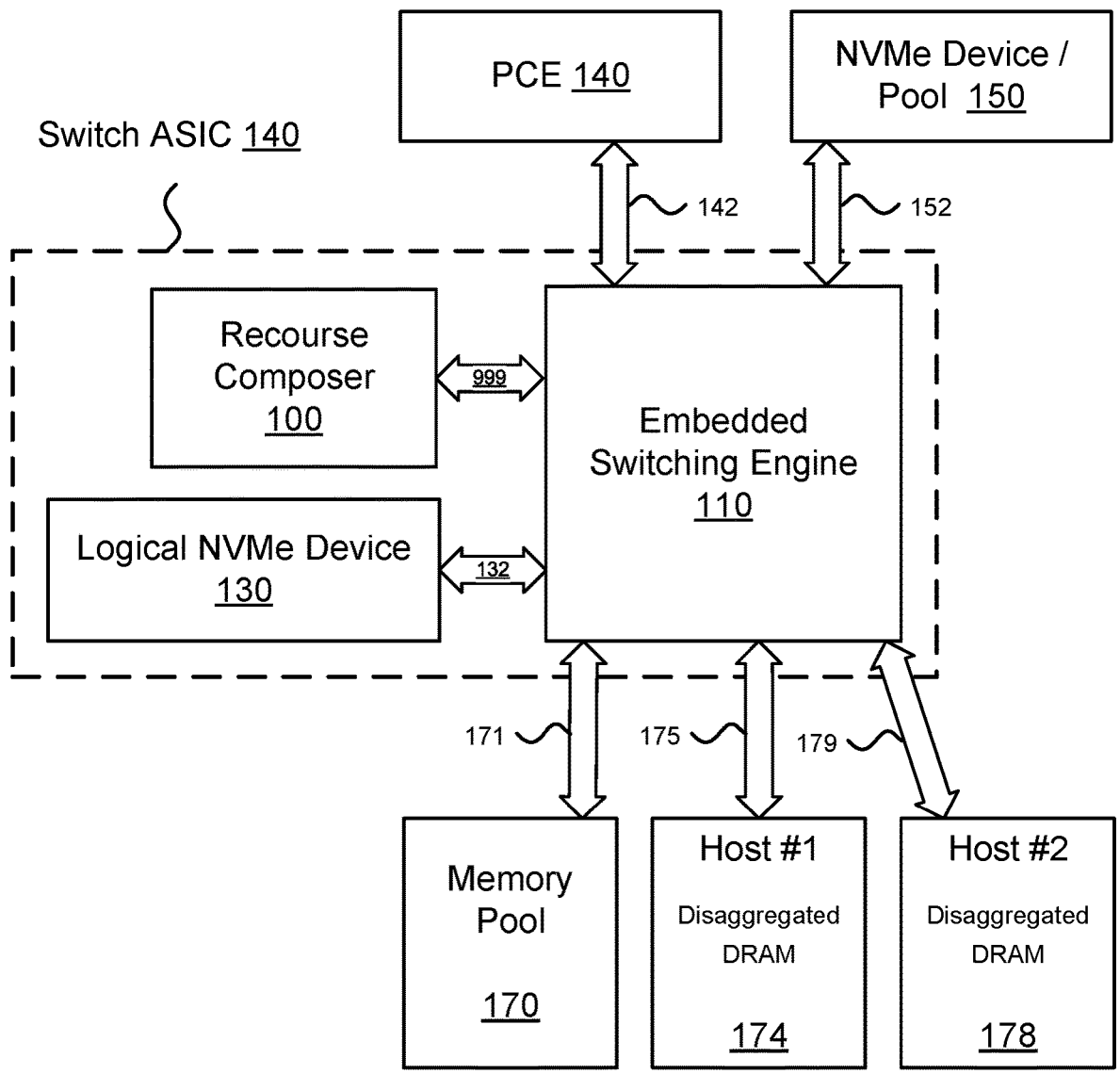
FIG. 4 illustrates System view showing a Resource Composer tightly integrated within a switch ASIC exposing a Logical NVMe Device to PCE.

FIG. 4 illustrates a Resource Composer and Logical NVMe Device Integration within Switch ASIC. FIG. 4 provides a detailed view of a system where the resource composer is integrated within a switch ASIC, exposing the logical NVMe device directly to the PCE. This integration results in a smart switch, enhancing the system's capabilities beyond a standard switch. In this embodiment, the resource composer and the logical NVMe device are connected to internal ports of the switch ASIC and are contained within the same package or silicon die. The resource composer interacts with and controls the embedded switching engine via the control and management path 999, dictating the behavior of the system. This figure also serves as a contrast to FIG. 5, where the resource composer is situated externally to the switch.

Figure 5:
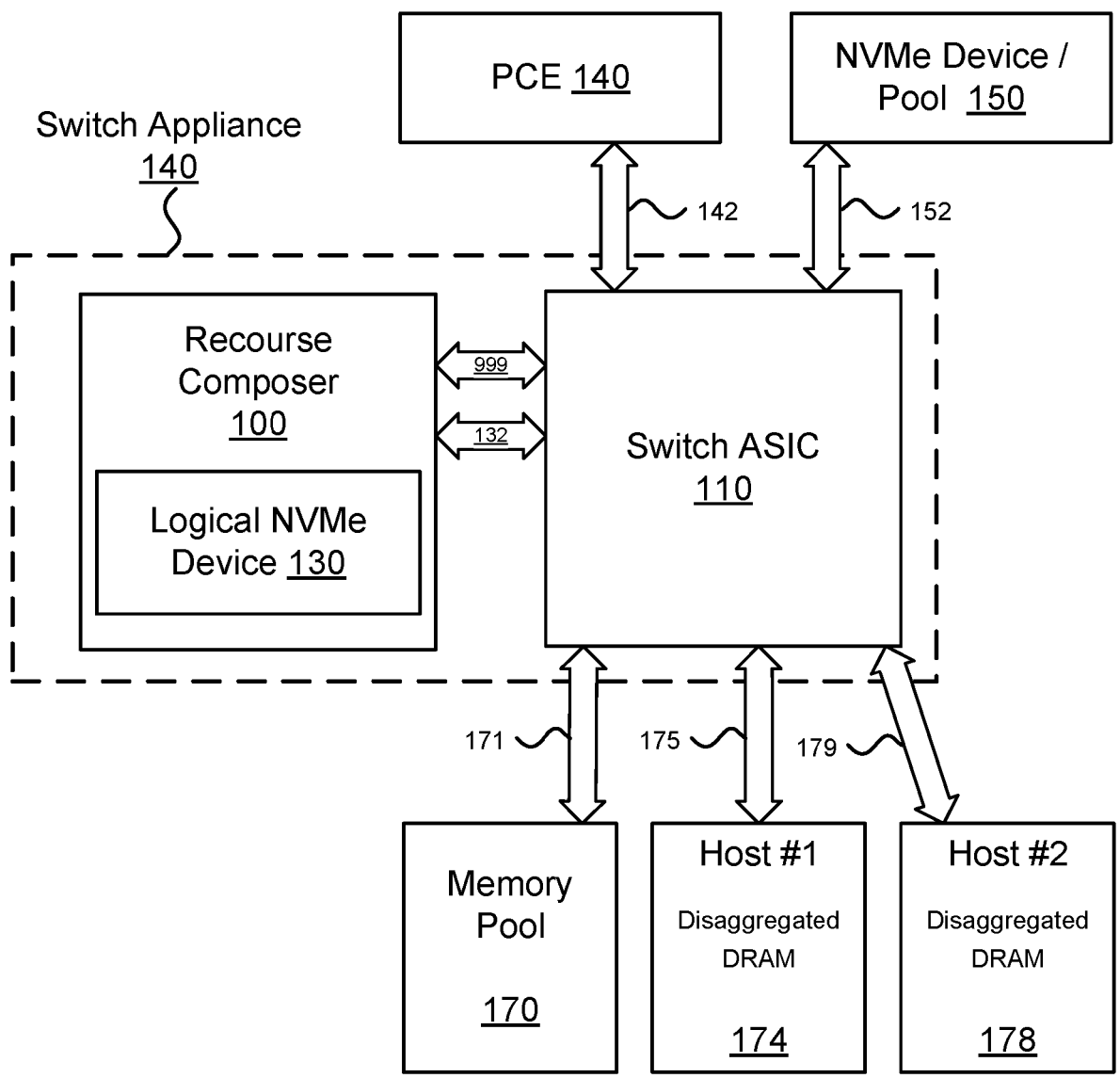
FIG. 5 illustrates System view showing a Resource Composer integrated within a switch Appliance exposing a Logical NVMe Device to PCE.

FIG. 5 illustrates Exposing Logical NVMe Device to PCE via External Resource Composer Integration. In this system schematic, the resource composer is positioned outside of the switch ASIC, showcasing an alternative system configuration. Here, the resource composer is not embedded within the switch but is an external component, which could be realized as an ASIC, hardware, software, or a combination thereof, housed within a switch appliance box. Additionally, this figure highlights the possibility of the logical NVMe device being integrated within the resource composer component, rather than existing as a separate entity. This design choice underscores the versatility of the resource composer, as it has the capability to create and expose the NVMe logical device abstraction to the rest of the system, ensuring seamless integration and communication.

Figure 6:
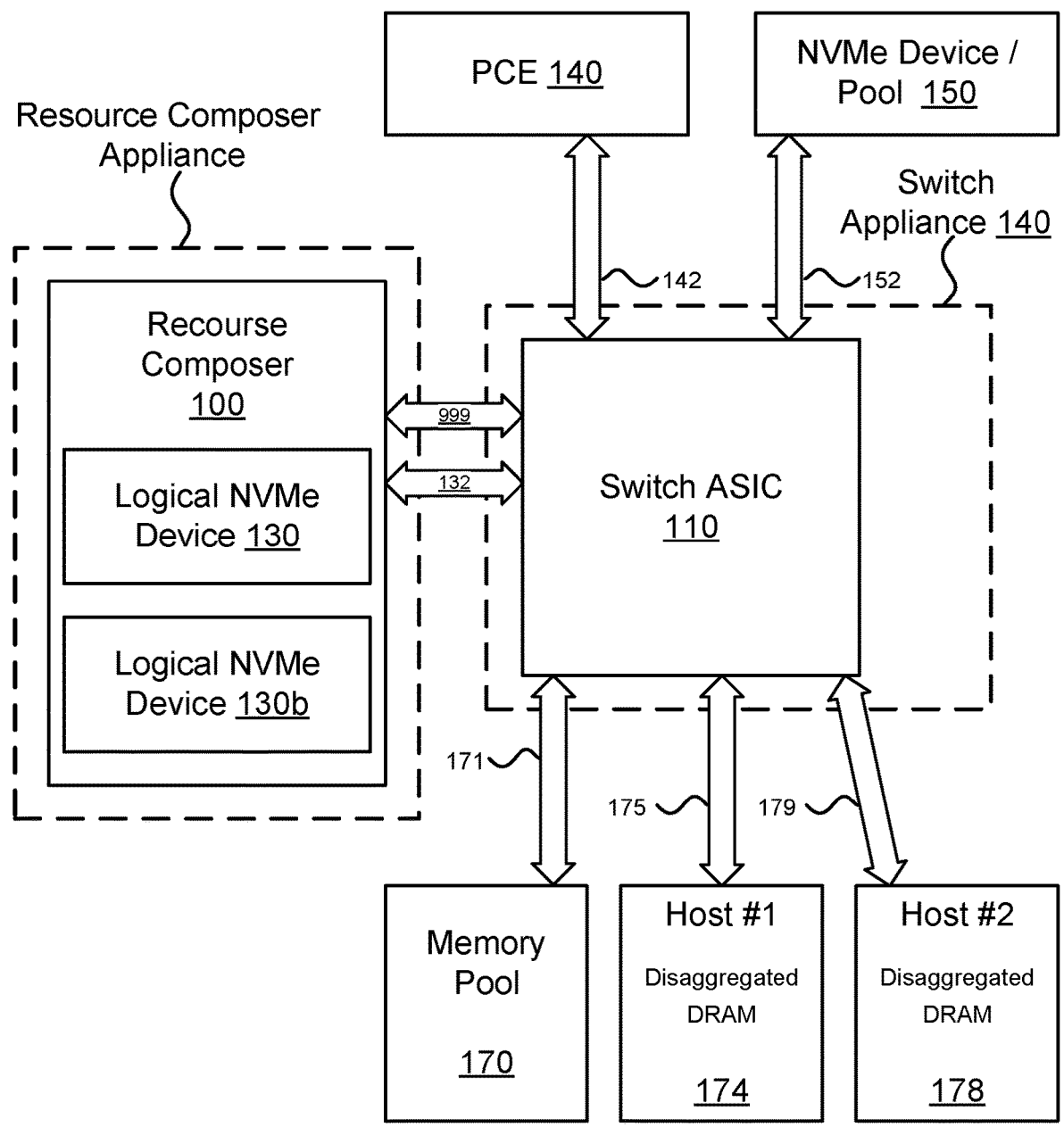
FIG. 6 illustrates System view showing a Resource Composer Appliance exposing Logical NVMe Devices to PCE via a switch Appliance.

FIG. 6 illustrates a Standalone Resource Composer Appliance with Multiple Logical NVMe Device Exposures. FIG. 6 showcases a system view where the Resource Composer is completely separated from the switch ASIC and the switch appliance, demonstrating that it can operate as an entirely independent entity. Unique to this configuration: (1) The Resource Composer is placed externally to both the switch ASIC and the switch appliance, illustrating its ability to function autonomously. (2) A singular Resource Composer is depicted exposing multiple Logical NVMe Devices to a single PCE, showcasing its multitasking capabilities.

In this specific embodiment, the Resource Composer operates independently, potentially housed in its own dedicated appliance within a rack. It effectively exposes multiple Logical NVMe Devices, underlining its versatility and efficiency in handling storage resources.

Figure 7:
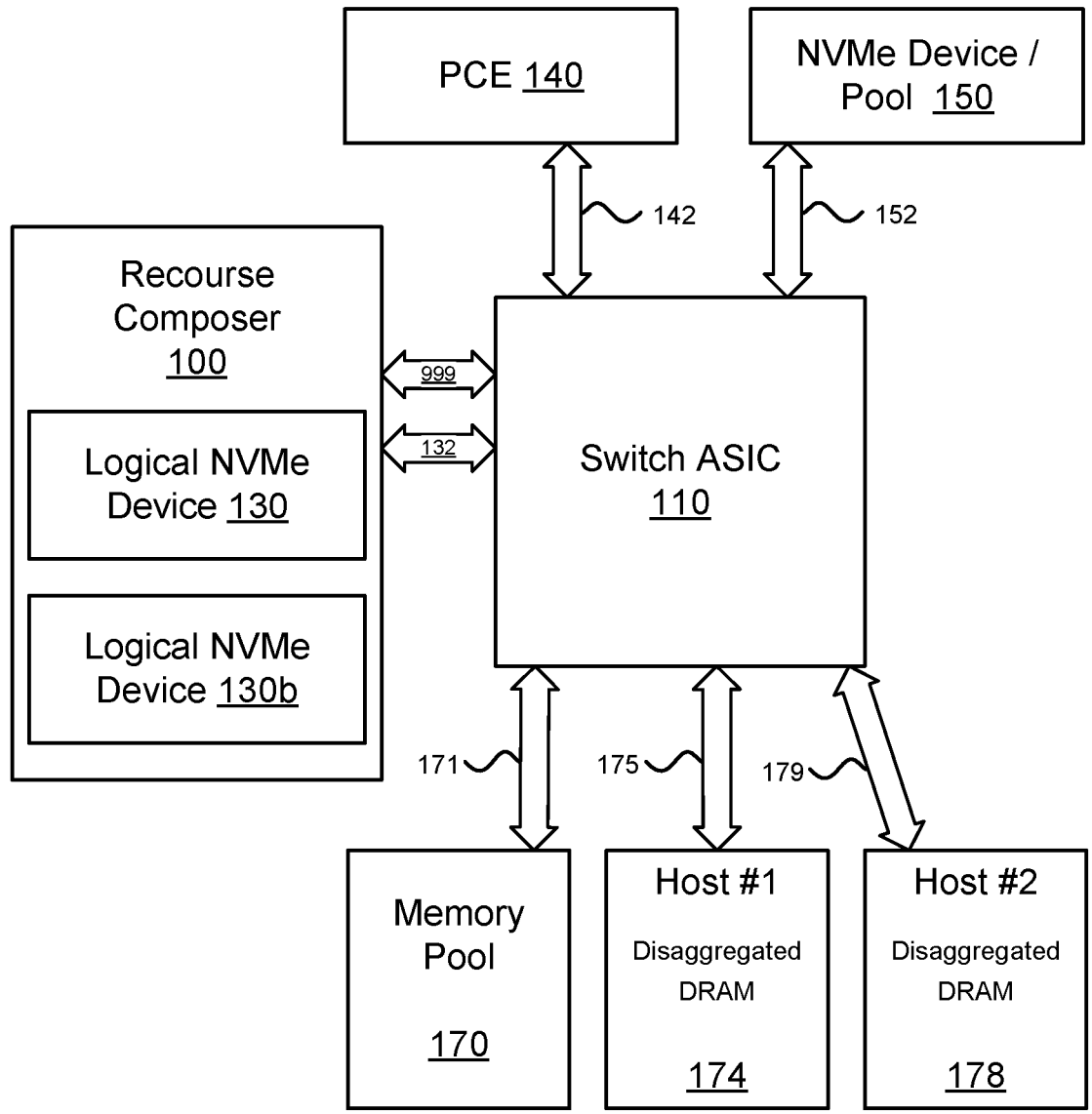
FIG. 7 illustrates System view showing a Resource Composer exposing a Logical NVMe Device to PCE via a switch.

FIG. 7 illustrates a Generic Embodiment of Resource Composer Exposing Logical NVMe Device via switch. FIG. 7 illustrates a system configuration similar to that of FIGS. 3-4. However, it distinguishes itself by not necessarily being a part of a "switch appliance." Instead, it presents a more generic embodiment featuring a "switch," where the "Resource Composer" and the "Logical NVMe Device(s)" are situated externally to the switch. Link "999" represents a control and management connection that dictates the behavior of the switch ASIC, while link "132" is a CXL data transfer link. These links could either operate separately or be amalgamated into a single CXL link, with control and management traffic interwoven with data transmission within the same physical connection. This setup ensures that the Logical NVMe Device 130 is accessible to the PCE 140 via a specified switch port, as directed by the Resource Composer.

Figure 8:
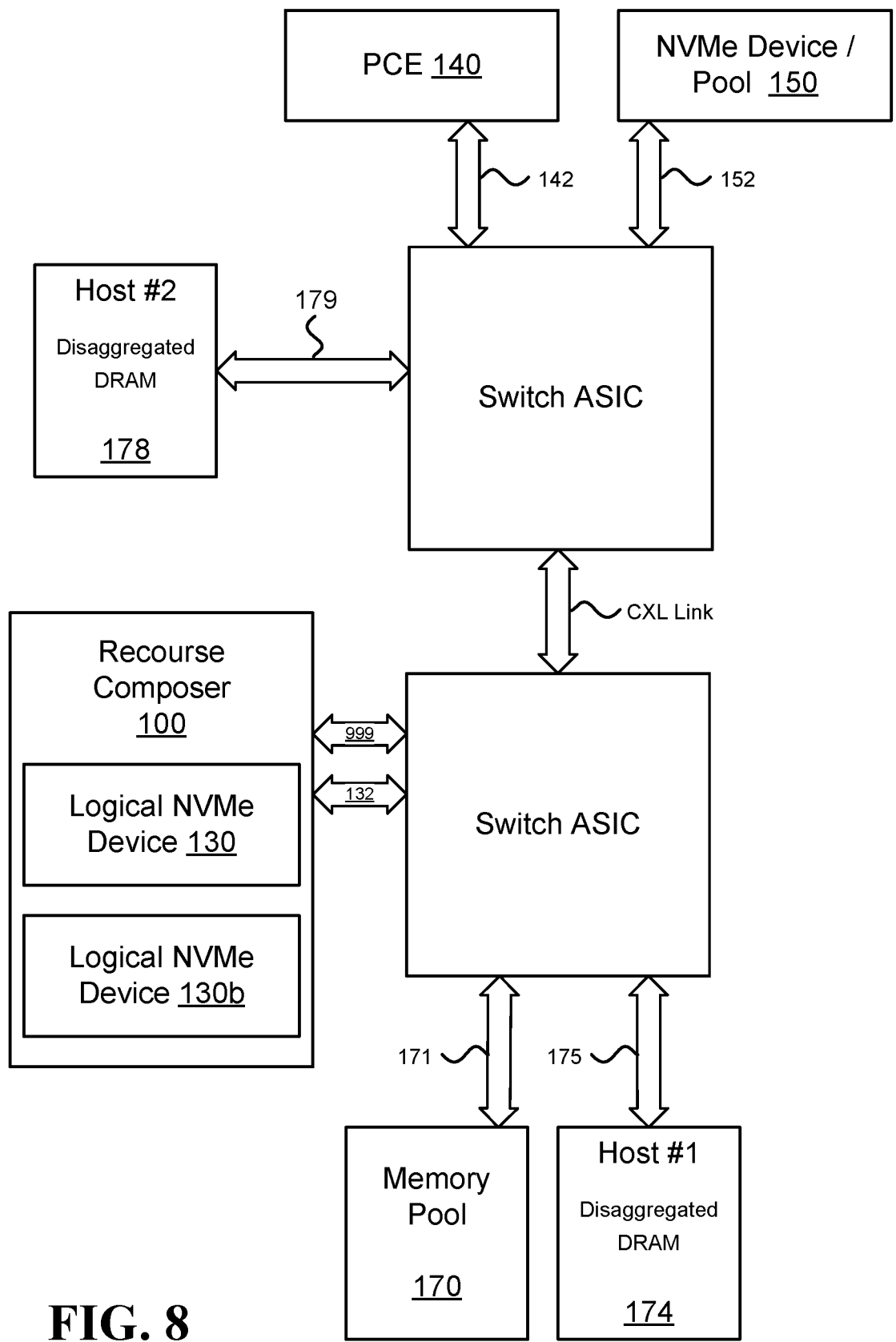
FIG. 8 illustrates System view showing a Resource Composer exposing a Logical NVMe Device to remote PCE via multiple switches.

FIG. 8 illustrates a Resource Composer Exposing Logical NVMe Device Across Multiple switches. FIG. 8 introduces a second switch to the system, highlighting the capability of the Resource Composer to expose a Logical NVMe Device to a PCE, even when they are connected to different switches. Furthermore, it showcases the independence of the Resource Composer from the switch that connects to the NVMe Device/Pool used for backend storage. This figure essentially represents a CXL Fabric, demonstrating the system's potential for flexible device exposures over multiple switch hops and in varied locations.

Figure 9:
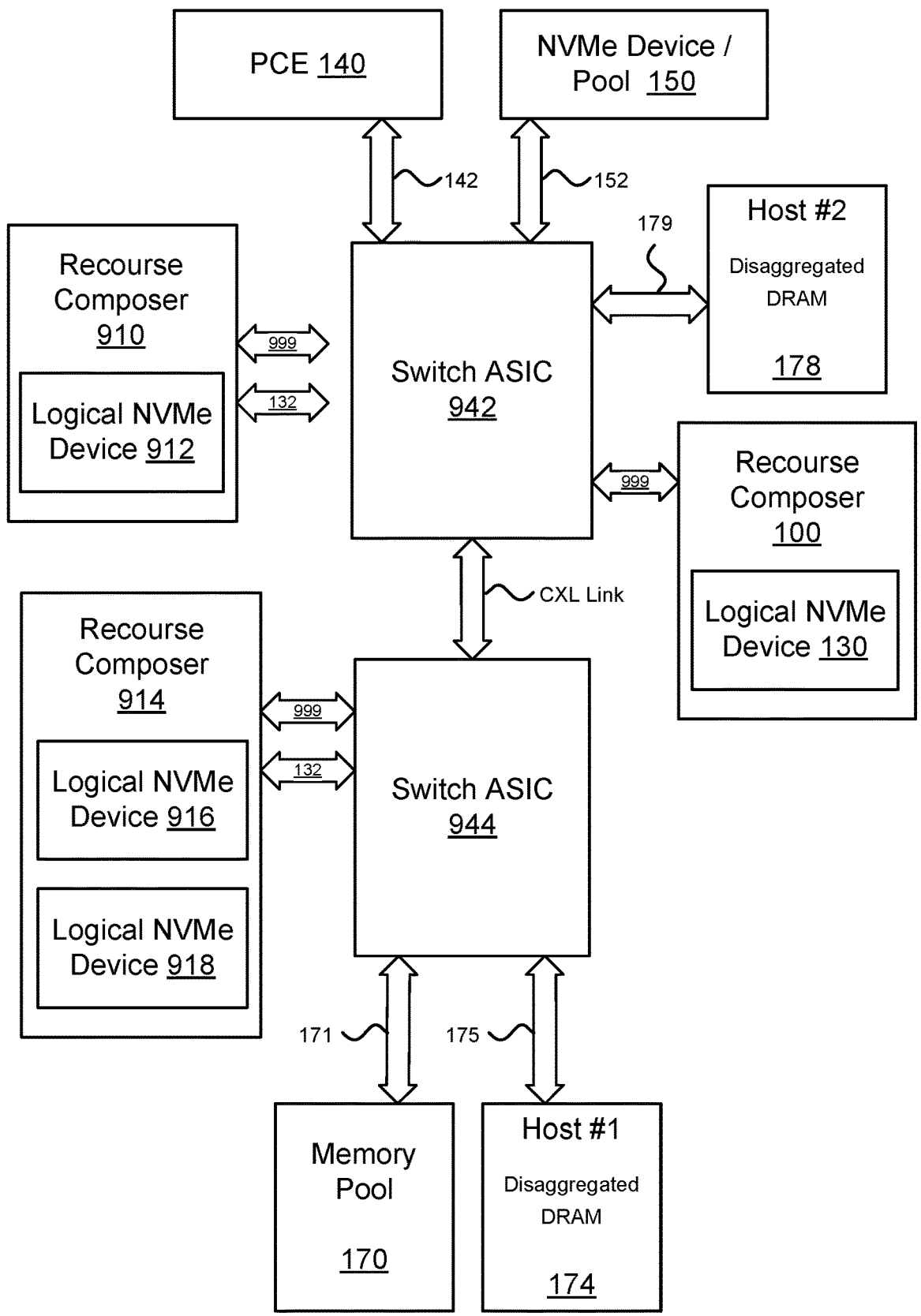
FIG. 9 illustrates System view showing multiple Hosts and Resource Composers interconnected via multiple switches.

FIG. 9 illustrates a Multi-Host, Multi-Resource Composer System Interconnected via switch fabric. This figure underscores the system's scalability and versatility, illustrating the presence of multiple "Resource Composer" entities, each connecting to different switches within a CXL Fabric and exposing various logical devices to different PCEs. Some Resource Composers connect to the switch via a single CXL link (supporting data, control, and status management), while others utilize multiple CXL links to enhance bandwidth availability. This diversity in connections underscores the system's adaptability to different bandwidth and communication requirements.

Figure 10:
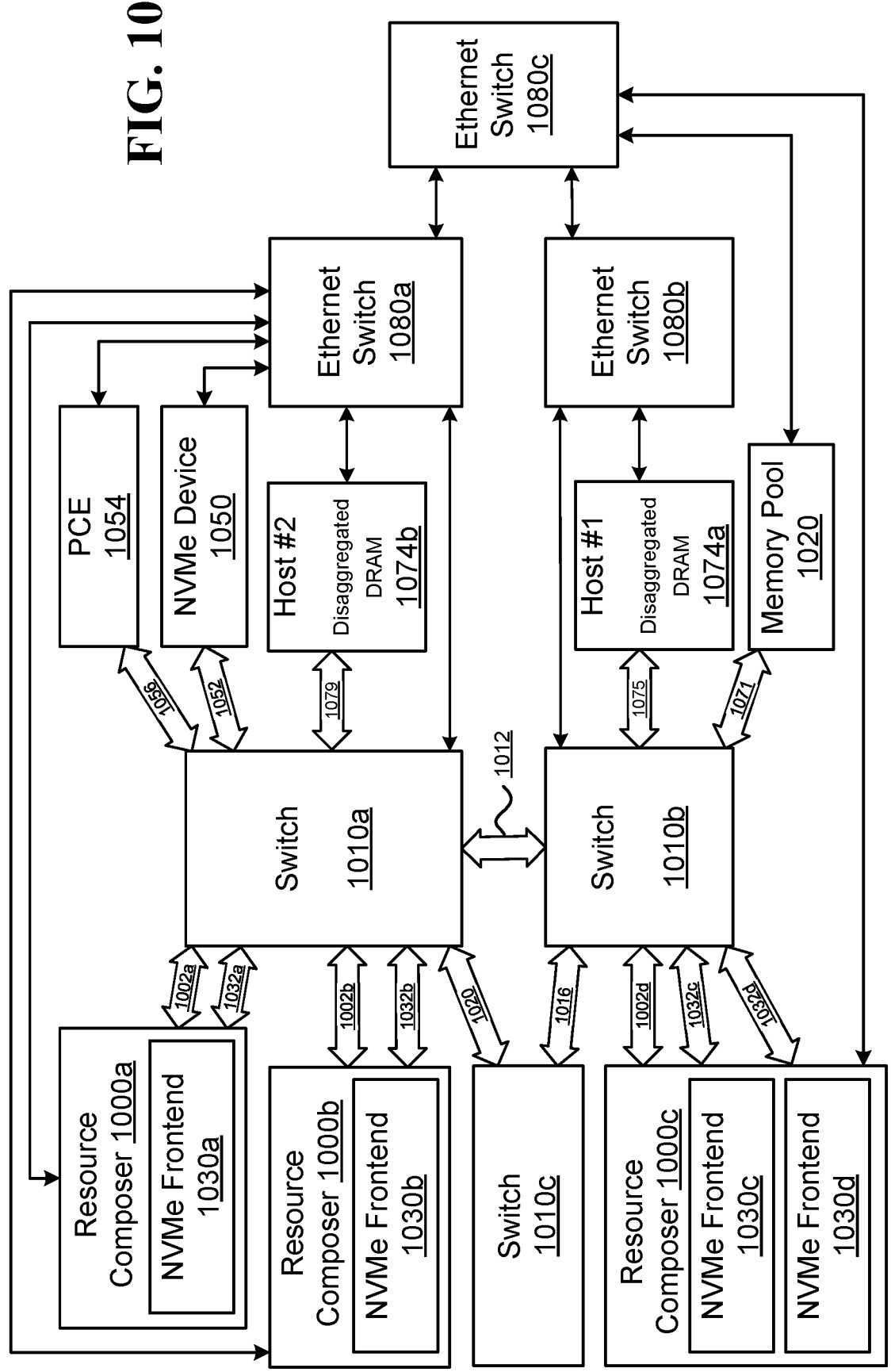
FIG. 10 illustrates System view showing multiple Hosts and Resource Composers interconnected via multiple switches and Ethernet Switches.

FIG. 10 illustrates a Comprehensive System with Multi-Host, Multi-Resource Composer Interconnections via CXL and Ethernet Switches. FIG. 10 presents a holistic model, incorporating elements from all previous figures, showcasing a network composed of multiple switches and Ethernet Switches. The majority of the components, including hosts and switches, maintain connections to both the CXL and Ethernet networks, emphasizing the system's comprehensive connectivity. This configuration is common in datacenters, where control and management traffic often traverse out-of-band networks (in this case, Ethernet) separate from the primary data traffic network (CXL). This figure also highlights the flexibility in communication pathways, as control, status, and management data can be exchanged either inline over CXL or out-of-band over Ethernet, as exemplified by the kernel module on PCE 140 communicating page table data to a Resource Composer. Both communication methods are deemed valid and are supported by this comprehensive system architecture.

Figure 11:
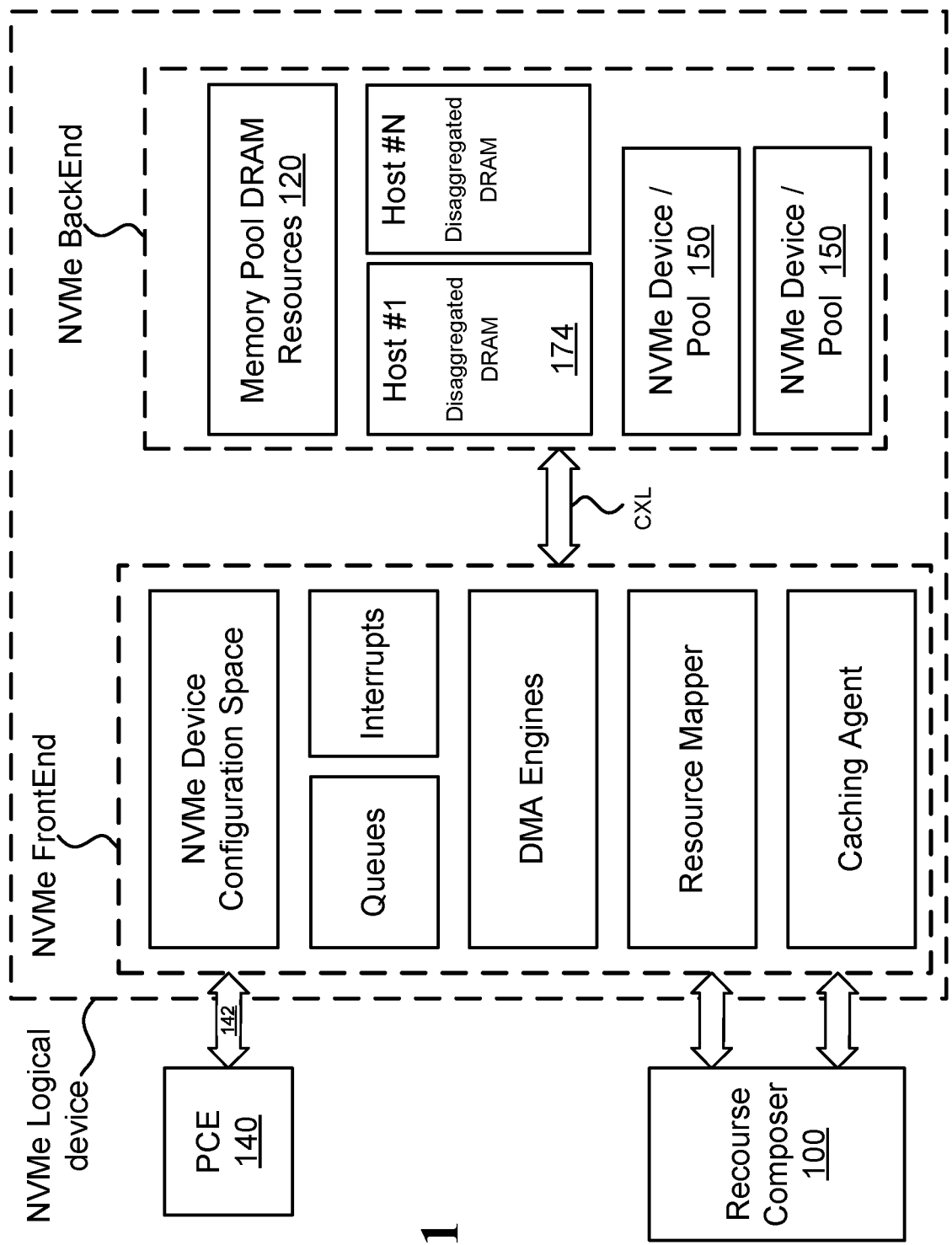
FIG. 11 illustrates NVMe Logical Device Front-End and Back-End Structure.

FIG. 11 illustrates Detailing the Front-End and Back-End Structure of a NVMe Logical Device. FIG. 11 provides a comprehensive view of a Logical NVMe Device, illustrating its division into two main sections: the Frontend (FE) and the Backend (BE).

The FE serves as the device abstraction visible to the Processor Compute Element (PCE), presenting itself similarly to a standard native NVMe device. This means that, from the perspective of the PCE, the Logical NVMe Device operates just like a conventional NVMe device, ensuring compatibility and ease of integration.

On the other hand, the BE encompasses the actual storage resources utilized for data retention and retrieval on the NVMe device. In a typical NVMe Solid State Drive (SSD), this section would contain the bulk NAND Flash memory for data storage and a smaller DRAM cache to aid in performance enhancement. For instance, the DRAM cache may be used to quickly access frequently requested data (read cache) or to temporarily hold write data (write cache). A common configuration in many NVMe SSD controllers is a caching ratio of 1:1,000 between the DRAM cache and the bulk NAND Flash storage.

In the context of this Logical NVMe Device, the Resource Mapper plays a role by interacting with the Resource Composer to allocate remote DRAM from Memory Pools or Disaggregated DRAM from remote Hosts for data storage purposes. The configuration of the Logical NVMe Device dictates whether it operates as an Ephemeral Storage Service or a Persistent Storage Service. In Ephemeral mode, data persistence is not assured across system resets or power loss events. Conversely, in Persistent mode, data remains stored until it is explicitly erased.

The Caching Agent enhances the device's performance by opportunistically utilizing DRAM resources as cache for the Logical NVMe Device. It interacts with the Resource Composer to identify and utilize available DRAM resources, which may be sourced from Memory Pools or Hosts connected over CXL. Given the substantial amounts of DRAM often present and potentially underutilized in data centers, the Logical NVMe Device's caching ratio—and therefore its performance—may significantly surpass that of a traditional NVMe SSD.

The Caching Agent operates dynamically, adjusting the DRAM cache size based on the availability of resources. It can expand the cache when additional unused DRAM is made available by the Resource Composer, or reduce the cache size upon the Resource Composer's instruction, reallocating DRAM resources as needed elsewhere in the system.

Figure 12A:
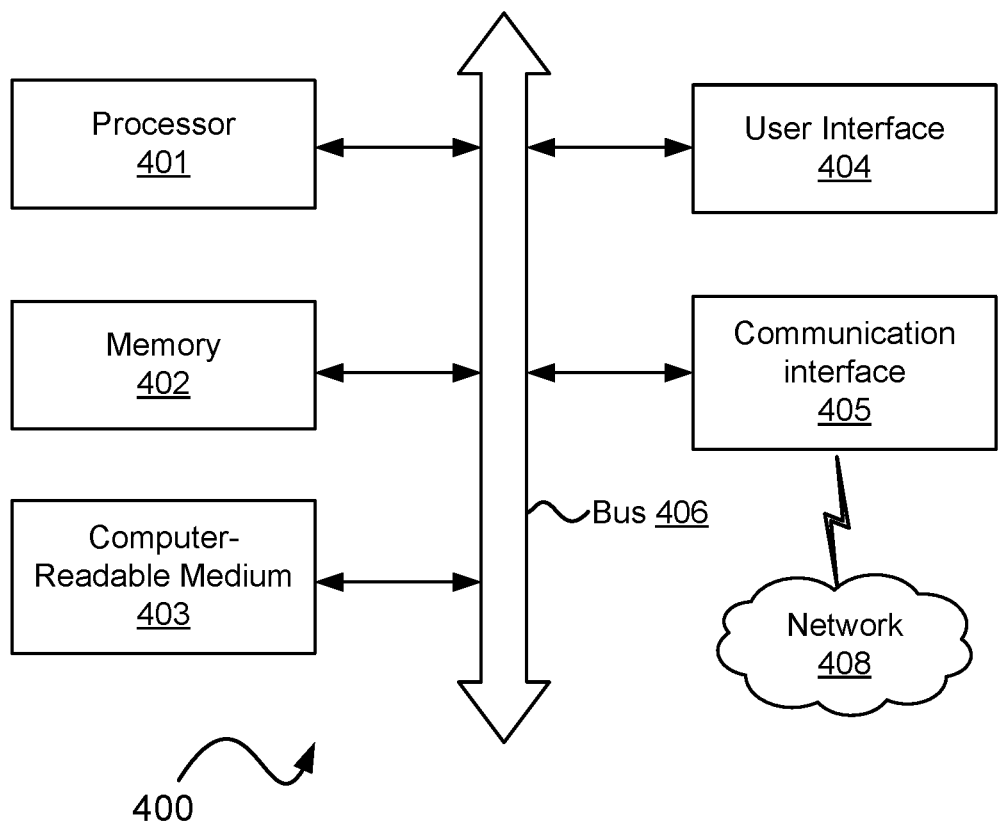
FIG. 12A and FIG. 12B are schematic illustrations of possible embodiments of computers.
Figure 12B:
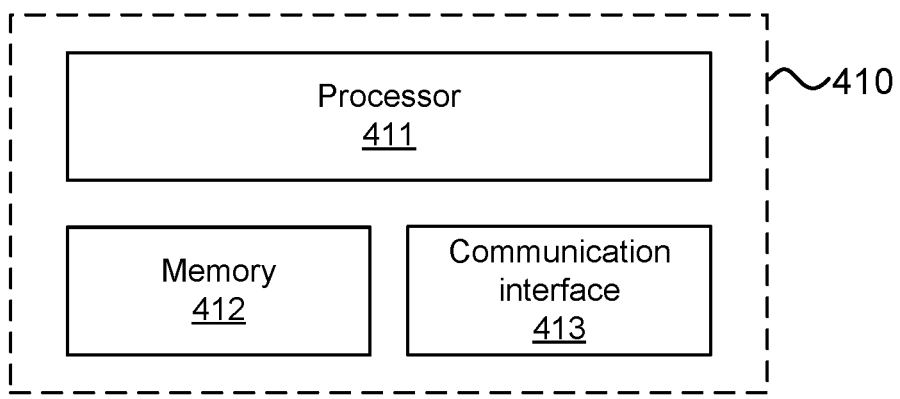

Various embodiments described herein involve interconnected host computers. FIG. 12A and FIG. 12B are schematic illustrations of possible embodiments of computers (400, 410) that are able to realize one or more of the embodiments discussed herein that include a "computer". The computer (400, 410) may be implemented in various ways, such as, but not limited to, using a processor with its required peripherals, a microcontroller, a computer on a chip, a system-on-chip (SoC), a system-on-module (SoM), a host computer, and/or any other computer form capable of executing a set of computer instructions. Further, references to a computer or a processor include any collection of one or more computers and/or processors (which may be located on different printed circuit boards and/or at different locations) that individually or jointly execute one or more sets of computer instructions. This means that the singular term "computer" is intended to imply one or more computers, which jointly perform the functions attributed to "the computer".

The computer 400 includes one or more of the following components: processor 401, memory 402, computer readable medium 403, user interface 404, communication interface 405, and bus 406. The computer 410 includes one or more of the following components: processor 411, memory 412, and communication interface 413.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media (e.g., SRAM, DRAM, Flash memory), and/or communication media including any medium that facilitates transfer of a computer program from one place to another. Computer-readable medium may be any media that can be accessed by one or more computers to retrieve instructions, code, data, and/or data structures for implementation of the described embodiments. A computer program product may include a computer-readable medium. In one example, the computer-readable medium 403 may include one or more of the following: RAM, ROM, EEPROM, optical storage, magnetic storage, biologic storage, flash memory, or any other medium that can store computer readable data.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or another unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

Computer-readable medium may include a single medium and/or multiple media (e.g., a centralized or distributed database, and/or associated caches and servers) that store one or more sets of instructions. In various embodiments, a computer program, and/or portions of a computer program, may be stored on a non-transitory computer-readable medium, and may be updated and/or downloaded via a communication network, such as the Internet. Optionally, the computer program may be downloaded from a central repository, such as Apple App Store and/or Google Play. Optionally, the computer program may be downloaded from a repository, such as an open source and/or community run repository (e.g., GitHub).

At least some of the methods described herein are "computer-implemented methods" that are implemented on a computer, such as the computer (400, 410), by executing instructions on the processor (401, 411). Additionally, at least some of these instructions may be stored on a non-transitory computer-readable medium.

I claim:

1. A system configured to utilize underutilized-allocated-DRAM, comprising:
    a first host, a second host, and a resource composer, which are coupled via Compute Express Link (CXL);
    the first and second hosts are configured to run first and second packaged computing environments (PCE1, PCE2), respectively; wherein each PCE comprises at least one of a container or a virtual machine;
    the resource composer is configured to:
    receive from a kernel module, running on the first host, values of page table and process control block of a first process (P1) running in the PCE1;
    determine, based on the values, that the P1 has not been using, for a predefined duration, a portion of P1 address space mapped to certain page frames pointing to DRAM on the first host;
    map the certain page frames to address space of a second process (P2) that runs in the PCE2 on the second host;
    utilize CXL.mem commands to communicate with the PCE2; and
    translate, based on the map, the CXL.mem commands to CXL.cache or CXL.io commands suitable for accessing the certain page frames.

2. The system of claim 1, further comprising a third host, coupled to the resource composer via CXL, configured to run a third packaged computing environments (PCE3); and wherein the resource composer is further configured to: receive from a kernel module, running on the third host, third values of page table and process control block of a third process (P3) running in the PCE3; determine, based on the third values, that the P3 has not been using, for a predefined duration, a portion of P3 address space mapped to a set of page frames; and utilize CXL.cache protocol to map the set of page frames to address space of the P2 running in the PCE2.

3. The system of claim 1, wherein the resource composer comprises a switch, and input/output memory management unit (IOMMU) or memory management unit (MMU) on the second host is configured by the resource composer with additional entries to map remote physical pages to local virtual pages.

4. The system of claim 1, wherein the resource composer comprises a switch, and the resource composer is further configured to utilize CXL's Address Translation Services (ATS) to intercept memory access requests from the P2 and translate virtual addresses to corresponding physical addresses on the first host.

5. The system of claim 1, wherein the resource composer comprises a switch, and the resource composer is further configured to utilize CXL's Segment Translation Services (STS) to define underutilized physical pages on the first host as a global space and map it to a local space accessible to the P2.

6. The system of claim 1, wherein the resource composer is further configured to utilize a table tracking mappings between virtual addresses in the CXL.mem commands utilized to communicate with the PCE2 and physical addresses of the certain page frames on the first host to perform the translation between CXL.mem format and CXL.cache format.

7. The system of claim 1, wherein the resource composer is further configured to utilize a translation lookaside buffer (TLB), which caches recent translations between virtual addresses in the CXL.mem commands and physical addresses of the certain page frames on the first host, to perform the translation between CXL.mem commands and CXL.cache commands without maintaining a complete table.

8. The system of claim 1, wherein the resource composer is further configured to utilize CXL's Address Translation Services (ATS) or Segment Translation Services (STS) to perform the translation based on inline on-demand mapping of virtual addresses in the CXL.mem commands to physical addresses of the certain page frames when the CXL.mem commands are received.

9. The system of claim 1, wherein upon receiving a CXL.mem read command referencing a logical address from the PCE2, the resource composer is further configured to: look up a corresponding physical address of the certain page frames on the first host, issue a CXL.cache read command to read data from the certain page frames, convert the returned CXL.cache read response to CXL.mem format, and send the response back to the PCE2.

10. The system of claim 1, wherein the resource composer is further configured to map page frames to some of the portion of P1 address space responsive to receiving an indication that the PCE1 attempts to access the some of the portion of P1 address space.

11. The system of claim 1, wherein before the map of the certain page frames to address space of P2, the resource composer is further configured to: remove mapping between the certain page frames and P1 address space, and erase data stored in the certain page frames.

12. The system of claim 11, wherein, before erasing the data stored in the certain page frames, the resource composer is further configured to flush the data stored in the certain page frames to at least one of: memory featuring a longer latency, a flash drive, or a hard disk drive.

13. The system of claim 1, wherein, before the map of the certain page frames to address space of P2, the resource composer is further configured to apply memory compression to data associated with P1 address space, and utilize memory that was freed by the compression for at least some of the certain page frames.

14. The system of claim 1, further comprising a third host, coupled to the resource composer via CXL, configured to run a third packaged computing environments (PCE3); and wherein the resource composer is further configured to: receive from a kernel module, running on the third host, third values of page table and process control block of a third process (P3) running in the PCE3; determine, based on the third values, that the P3 has not been using, for a predefined duration, a portion of P3 address space mapped to a set of page frames; and utilize CXL.io protocol to map the set of page frames to address space of the P2 running in the PCE2.

15. The system of claim 1, wherein the resource composer is configured to translate the CXL.mem commands to CXL.io commands, and to utilize a custom input/output memory management unit (IOMMU) containing dedicated page tables that map specific physical page frames on the first host to allocated virtual memory pages usable by the P2.

16. The system of claim 1, wherein the resource composer is further configured to mark as inaccessible relevant portion of the P1 address space before the map of the certain page frames to address space of P2; and responsive to receiving an indication that the P1 attempts accessing the relevant portion, the resource composer is further configured to map page frames to the relevant portion of the P1 address space.

17. The system of claim 1, wherein responsive to receiving an indication that the P1 attempts accessing some of the portion of P1 address space, the resource composer is further configured to evict and erase data stored in the certain page frames, and map the certain page frames to P1 address space utilizing CXL.mem.

18. A method for utilizing underutilized-allocated-DRAM, comprising:
receiving, by a resource composer from a kernel module running on a first host, values of page table and process control block of a first process (P1) running in a first packaged computing environment (PCE1) on the first host;
determining, by the resource composer based on the values, that the P1 has not been using, for a predefined duration, a portion of P1 address space mapped to certain page frames pointing to DRAM on the first host;
mapping, by the resource composer, the certain page frames to address space of a second process (P2) that runs in a second packaged computing environment (PCE2) on a second host;
utilizing, by the resource composer, Compute Express Link (CXL) CXL.mem commands to communicate with the PCE2; and
translating, by the resource composer based on the mapping, the CXL.mem commands to CXL.cache or CXL.io commands suitable for accessing the certain page frames.

19. The method of claim 18, further comprising: receiving, by the resource composer from a kernel module running on a third host, third values of page table and process control block of a third process (P3) running in a third packaged computing environment (PCE3) on the third host; determining, by the resource composer based on the third values, that the P3 has not been using, for a predefined duration, a portion of P3 address space mapped to a set of page frames; and utilizing, by the resource composer, CXL.cache protocol to map the set of page frames to address space of the P2 running in PCE2.

20. A non-transitory computer readable medium storing data comprising instructions configured to cause a computer to execute steps comprising:
receiving, by a resource composer from a kernel module running on a first host, values of page table and process control block of a first process (P1) running in a first packaged computing environment (PCE1) on the first host;
determining, by the resource composer based on the values, that the P1 has not been using, for a predefined duration, a portion of P1 address space mapped to certain page frames pointing to DRAM on the first host;
mapping, by the resource composer, the certain page frames to address space of a second process (P2) that runs in a second packaged computing environment (PCE2) on a second host;
utilizing, by the resource composer, Compute Express Link (CXL) CXL.mem commands to communicate with the PCE2; and
translating, by the resource composer based on the mapping, the CXL.mem commands to CXL.cache or CXL.io commands suitable for accessing the certain page frames.

* * * * *